(12) United States Patent
Ogyu

(10) Patent No.: US 8,414,838 B2
(45) Date of Patent: Apr. 9, 2013

(54) HONEYCOMB FILTER AND EXHAUST GAS PURIFYING APPARATUS

(75) Inventor: Kazutake Ogyu, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 70 days.

(21) Appl. No.: 12/941,089

(22) Filed: Nov. 8, 2010

(65) Prior Publication Data

US 2011/0129391 A1  Jun. 2, 2011

(30) Foreign Application Priority Data

Dec. 1, 2009  (WO) .................. PCT/JP2009/070166

(51) Int. Cl.
| | |
|---|---|
| B01D 50/00 | (2006.01) |
| B01D 53/34 | (2006.01) |
| B01D 39/00 | (2006.01) |
| B01D 46/46 | (2006.01) |
| B01J 19/00 | (2006.01) |
| B01J 8/00 | (2006.01) |
| B01J 8/02 | (2006.01) |
| B01J 35/02 | (2006.01) |
| B01J 29/00 | (2006.01) |
| F01N 3/00 | (2006.01) |

(52) U.S. Cl.
USPC ........... 422/180; 422/129; 422/168; 422/177; 422/187; 422/211; 55/490; 95/1; 502/100

(58) Field of Classification Search .................. 422/129, 422/167, 177, 180, 187, 211; 96/108; 55/482, 55/486, 490, 495, 523; 428/116, 117; 502/22, 502/502/27, 28, 100, 174, 180, 181, 20, 400, 502/416, 417
See application file for complete search history.

(56) References Cited

U.S. PATENT DOCUMENTS

| | | | |
|---|---|---|---|
| 7,575,727 B2* | 8/2009 | Fukushima | .................. 422/179 |
| 8,128,723 B2* | 3/2012 | Mizutani | .......................... 55/523 |
| 2001/0001647 A1* | 5/2001 | Leyrer et al. | .................. 422/180 |
| 2008/0032090 A1 | 2/2008 | Beall et al. | |
| 2009/0238732 A1* | 9/2009 | Ohno | ............................ 422/180 |

FOREIGN PATENT DOCUMENTS

| | | |
|---|---|---|
| EP | 1060784 | 12/2000 |
| EP | 1920838 | 5/2008 |
| EP | 2241362 | 10/2010 |

(Continued)

OTHER PUBLICATIONS

International Search Report for corresponding International Application No. PCT/JP2009/070166, Sep. 7, 2010.

(Continued)

*Primary Examiner* — Walter D Griffin
*Assistant Examiner* — Natasha Young
(74) *Attorney, Agent, or Firm* — Ditthavong Mori & Steiner, P.C.

(57) ABSTRACT

A honeycomb filter includes cell walls. The cell walls extend along a longitudinal direction of the honeycomb filter to define a plurality of cells each of which has one end and another end opposite to the one end along the longitudinal direction. A majority of the plurality of cells are sealed cells sealed at either the one end or the another end. A part of the plurality of cells are open cells open at both of the one end and the another end. A number of the open cells is from about 0.1% to about 4.9% of a number of the plurality of cells.

42 Claims, 13 Drawing Sheets

A-A line cross-sectional view

FOREIGN PATENT DOCUMENTS

| | | |
|---|---|---|
| JP | 57-201518 | 12/1982 |
| JP | 60-3420 | 1/1985 |
| JP | 1-27767 B2 | 5/1989 |
| JP | 2001-096113 | 4/2001 |
| JP | 2002-371826 | 12/2002 |
| JP | 2006-231162 | 9/2006 |
| JP | 2009154124 A * | 7/2009 |
| WO | WO 2006/056211 | 6/2006 |
| WO | WO 2007/026803 | 3/2007 |
| WO | WO 2007/094499 | 8/2007 |
| WO | WO 2009/084567 | 7/2009 |
| WO | WO 2009/148498 | 12/2009 |

OTHER PUBLICATIONS

Extended European Search Report for corresponding EP Application No. 10176802.6-2113, Nov. 24, 2010.

\* cited by examiner

A-A line cross-sectional view

A-A line cross-sectional view

B-B line cross-sectional view

B-B line cross-sectional view

HONEYCOMB FILTER AND EXHAUST GAS PURIFYING APPARATUS

CROSS-REFERENCE TO RELATED APPLICATIONS

The present application claims priority under 35 U.S.C. §119 to International Application No. PCT/JP2009/070166 filed on Dec. 1, 2009, the contents of which are incorporated herein by reference in their entirety.

BACKGROUND OF THE INVENTION

1. Field of the Invention

The present invention relates to a honeycomb filter and an exhaust gas purifying apparatus.

2. Discussion of the Background

Since emphasis has been put on environmental problems in recent years, auto industry requires environmentally-friendly engines with good fuel economy.

Diesel engines are advantageously superior in fuel economy to gasoline engines, but unfortunately generate particulate matters (hereinafter, also referred to as PMs) such as soot. Therefore, it is necessary to purify the PMs in exhaust gases by providing an exhaust gas purifying apparatus.

The gasoline engines advantageously have less emission of PMs compared with the diesel engines. Therefore, in general, it is presumably not necessary to provide an exhaust gas purifying apparatus for purifying the PMs. However, disadvantageously, the gasoline engines are inferior in fuel economy to the diesel engines.

Since automobile buyers tend to make much of fuel economy of automobiles in recent years, the number of automobiles equipped with a gasoline direct injection engine (GDI) excellent in fuel economy among the gasoline engines is expected to increase. However, since exhaust gases emitted from the gasoline direct injection engine contain PMs in a small amount, it seems necessary to install an exhaust gas purifying apparatus and purify PMs in the exhaust gas.

The exhaust gas purifying apparatus used for purifying an exhaust gas emitted from a diesel engine is manufactured by installing, in a metal casing, a honeycomb filter made of materials such as ceramics. The exhaust gas purifying apparatus can purify the exhaust gas by introducing the exhaust gas thereinto from the gas inlet side thereof, allowing the exhaust gas to pass through the filter, and discharging the exhaust gas from the gas outlet side thereof.

In such a filter, a plurality of cells are longitudinally disposed in parallel with one another with a cell wall interposed therebetween. The plurality of cells are all sealed at either one end, and therefore, an exhaust gas that flows into one cell never fails to pass through the cell wall that separates the cells, and then is discharged from another cell. Specifically, according to an exhaust gas purifying apparatus including such a filter, PMs contained in the exhaust gas are captured by the cell wall when passing through the filter, and as a result, the exhaust gas is purified.

Japanese Patent Application Publication (KOKAI) 2001-96113 discloses a honeycomb filter having such a structure and an exhaust gas purifying apparatus including a honeycomb filter installed in a casing.

The contents of Japanese Patent Application Publication (KOKAI) 2001-96113 are incorporated herein by reference in their entirety.

SUMMARY OF THE INVENTION

According to one aspect of the present invention, a honeycomb filter includes cell walls. The cell walls extend along a longitudinal direction of the honeycomb filter to define a plurality of cells each of which has one end and another end opposite to the one end along the longitudinal direction. A majority of the plurality of cells are sealed cells sealed at either the one end or the another end. A part of the plurality of cells are open cells open at both of the one end and the another end. A number of the open cells is from about 0.1% to about 4.9% of a number of the plurality of cells.

According to another aspect of the present invention, an exhaust gas purifying apparatus includes a metal casing and a honeycomb filter. The metal casing is provided with a gas inlet side and a gas outlet side. The honeycomb filter is installed in the metal casing. The honeycomb filter comprises cell walls. The cell walls extend along a longitudinal direction of the honeycomb filter to define a plurality of cells each of which has one end and another end opposite to the one end along the longitudinal direction. A majority of the plurality of cells are sealed cells sealed at either the one end or the another end. A part of the plurality of cells are open cells open at both of the one end and the another end. A number of the open cells is from about 0.1% to about 4.9% of a number of the plurality of cells.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
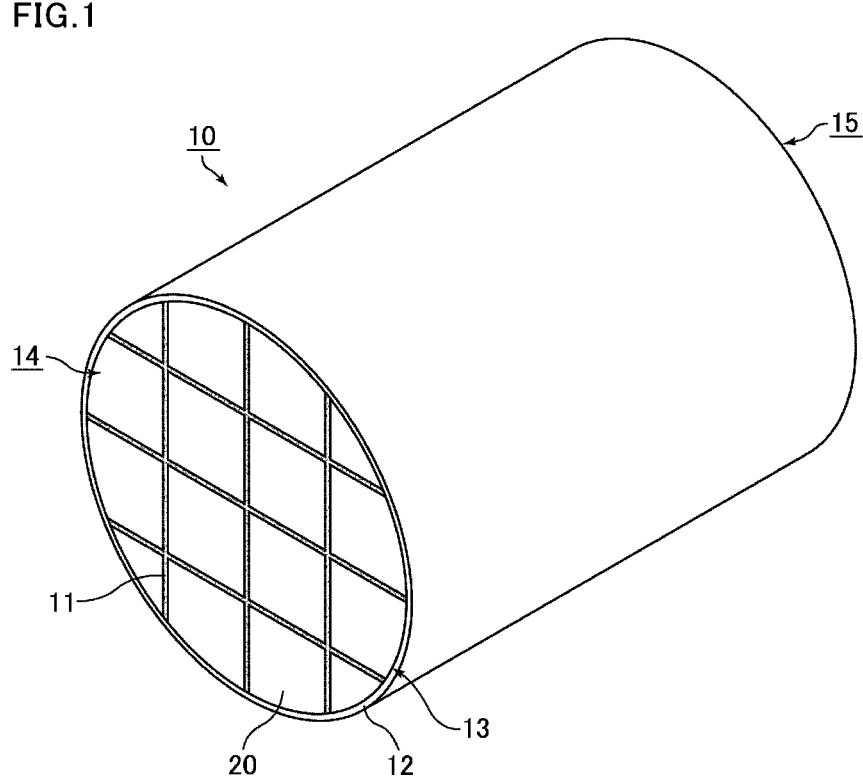
FIG. 1 is a perspective view schematically illustrating one example of a honeycomb filter according to a first embodiment of the present invention.

As mentioned above, the gasoline engines are disadvantageously inferior in fuel economy to the diesel engines. Accordingly, the use of the gasoline engines creates the need of preventing deterioration of the fuel economy. Therefore, in the case where an exhaust gas emitted from a gasoline engine is purified, a filter for purifying the exhaust gas is required to have a low pressure loss. On the other hand, the amount of PMs contained in the exhaust gas emitted from the gasoline engine is small. Therefore, it is considered that the filter for purifying the exhaust gas emitted from the gasoline engine may have a lower capture efficiency of PM compared with a filter for purifying an exhaust gas emitted form a diesel engine. Specifically, the filter for the gasoline engine is required to have a lower pressure loss even if having a reduced capture efficiency of PM compared with the filter for the diesel engine.

In light of the strong possibility that PMs contained in exhaust gases emitted from the gasoline direct injection engine will need to be purified as mentioned above, the present inventor has attempted to develop a honeycomb filter for purifying exhaust gases containing PMs in a small amount, a typical example of which is an exhaust gas emitted from the gasoline direct injection engine, and an exhaust gas purifying apparatus including the above-mentioned honeycomb filter.

The present inventor has investigated the factor that affects the pressure loss of the honeycomb filter upon purification of exhaust gases.

The main factors that affect the pressure loss of the honeycomb filter are cited: resistance upon entry of exhaust gases into the filter; resistance upon discharge of exhaust gases from the filter; friction upon passage through cells (inlet-side cell and outlet-side cell); resistance upon passage through cell walls; and the like.

Here, methods for decreasing the pressure loss include opening both ends of a cell of the honeycomb filter.

However, in the case where both ends of a cell of the honeycomb filter are opened, the pressure loss can be decreased, but PMs contained in an exhaust gas that does not pass through the cell wall are not captured by the cell wall, and as a result, the capture efficiency of PM is significantly reduced.

Under such a circumstance, the present inventor has investigated in detail the relationship between the capture efficiency of PM and the pressure loss in the honeycomb filter. Then, the inventor has found that, when a proportion of the number of cells unsealed at both ends in the number of a plurality of cells is adjusted to a predetermined range, the pressure loss can be more easily decreased significantly without any appreciable reduction in capture efficiency of PM, as compared with the case where the plurality of cells are all sealed at alternate ends.

A honeycomb filter according to an embodiment of the present invention includes a plurality of cells longitudinally disposed in parallel with one another with a cell wall interposed therebetween, wherein a majority of the plurality of cells are sealed cells sealed at either one end, a part of the plurality of cells is an open cell open at both ends, and the number of the open cell is from about 0.1% to about 4.9% of the number of the plurality of cells.

The honeycomb filter according to the embodiment of the present invention includes, as a part of the plurality of cells, an open cell open at both ends. Accordingly, some of the exhaust gases pass through the open cell, so that the pressure loss can be easily decreased compared with a honeycomb filter with no open cell.

In the honeycomb filter according to the embodiment of the present invention, the number of the open cell is from about 0.1% to about 4.9% of the number of the plurality of cells. When the number of the open cell is from about 0.1% to about 4.9% of the number of the plurality of cells, the pressure loss can more easily be decreased significantly without any appreciable reduction in capture efficiency of PM.

The honeycomb filter according to the embodiment of the present invention is suitably used for purifying exhaust gases containing PMs in a small amount, a typical of which is an exhaust gas emitted from a gasoline engine.

If the number of the open cell is about 0.1% or more of the number of the plurality of cells, the effect of decreasing the pressure loss can be more easily obtained. If the number of the open cell is about 4.9% or less of the number of the plurality of cells, the pressure loss can be more easily decreased, and the capture efficiency of PM tends not to be reduced too much. As a result, the functions as the filter are less likely to be deteriorated.

In the honeycomb filter according to an embodiment of the present invention, the number of the open cell is desirably from about 0.2% to about 1.1% of the number of the plurality of cells.

When the number of the open cell is from about 0.2% to about 1.1% of the number of the plurality of cells, the pressure loss can be more easily decreased without reducing the capture efficiency of PM.

In the honeycomb filter according to an embodiment of the present invention, desirably, on one end face side of the honeycomb filter, cells having a sealed end and cells having an open end among the plurality of cells are alternately disposed, the cells having a sealed end on the one end face side have an open end on the other end face side, and are the sealed cells, a majority of the cells having an open end on the one end face side have a sealed end on the other end face side, and are the sealed cells, and a part of the cells having an open end on the one end face side has an open end on the other end face side, and is the open cell.

In the honeycomb filter according to the embodiment of the present invention, more cells having an open end exist on the other end face side than on the one end face side. Therefore, it is considered to become easier that exhaust gases smoothly flow into the honeycomb filter, so that the pressure loss can more easily be further decreased.

An exhaust gas purifying apparatus according to an embodiment of the present invention includes: a metal casing provided with a gas inlet side and a gas outlet side; and
a honeycomb filter installed in the metal casing,
wherein
the honeycomb filter includes a plurality of cells longitudinally disposed in parallel with one another with a cell wall interposed therebetween,
a majority of the plurality of cells are sealed cells sealed at either one end,
a part of the plurality of cells is an open cell open at both ends, and
the number of the open cell is from about 0.1% to about 4.9% of the number of the plurality of cells.

The exhaust gas purifying apparatus according to the embodiment of the present invention includes a honeycomb filter with an open cell open at both ends as a part of the plurality of cells. Accordingly, some of the exhaust gases pass through the open cell, making it easier to decrease the pressure loss compared with an exhaust gas purifying apparatus including a honeycomb filter with no open cell.

In the honeycomb filter that configures the exhaust gas purifying apparatus according to the embodiment of the present invention, the number of the open cell is from about 0.1% to about 4.9% of the number of the plurality of cells. When the number of the open cell is from about 0.1% to about 4.9% of the number of the plurality of cells, the pressure loss can more easily be decreased significantly without any appreciable reduction in capture efficiency of PM.

If the number of the open cell is about 0.1% or more of the number of the plurality of cells, the effect of decreasing the pressure loss can be more easily obtained. If the number of the open cell is about 4.9% or less of the number of the plurality of cells, the pressure loss can be easily decreased, and the capture efficiency of PM tends not to be reduced too much. As a result, the functions as the filter are less likely to be deteriorated.

In the exhaust gas purifying apparatus according to an embodiment of the present invention, the number of the open cell is desirably from about 0.2% to about 1.1% of the number of the plurality of cells.

When the number of the open cell is from about 0.2% to about 1.1% of the number of the plurality of cells, the pressure loss can be more easily decreased without reducing the capture efficiency of PM.

In the exhaust gas purifying apparatus according to an embodiment of the present invention, desirably,
on one end face side of the honeycomb filter, cells having a sealed end and cells having an open end among the plurality of cells are alternately disposed,
the cells having a sealed end on the one end face side have an open end on the other end face side, and are the sealed cells,
a majority of the cells having an open end on the one end face side have a sealed end on the other end face side, and are the sealed cells,
a part of the cells having an open end on said one end face side has an open end on the other end face side, and is the open cell,
the one end face of the honeycomb filter is disposed on the gas inlet side of the metal casing, and
the other end face of the honeycomb filter is disposed on the gas outlet side of the metal casing.

In the exhaust gas purifying apparatus according to the embodiment of the present invention, more cells having an open end exist on the gas outlet side than on the gas inlet side. Therefore, exhaust gases will be more smoothly flow into the honeycomb filter, so that the pressure loss can be more easily decreased significantly.

In the exhaust gas purifying apparatus according to an embodiment of the present invention, the gas is desirably an exhaust gas emitted from a gasoline engine.

Such an exhaust gas purifying apparatus is suitably used for purifying exhaust gases containing PMs in a small amount, emitted from gasoline engines.

(First Embodiment)

The following description will discuss the honeycomb filter and the exhaust gas purifying apparatus according to a first embodiment of the present invention, with reference to drawings.

First, the honeycomb filter according to an embodiment of the present invention will be described.

Figure 2:
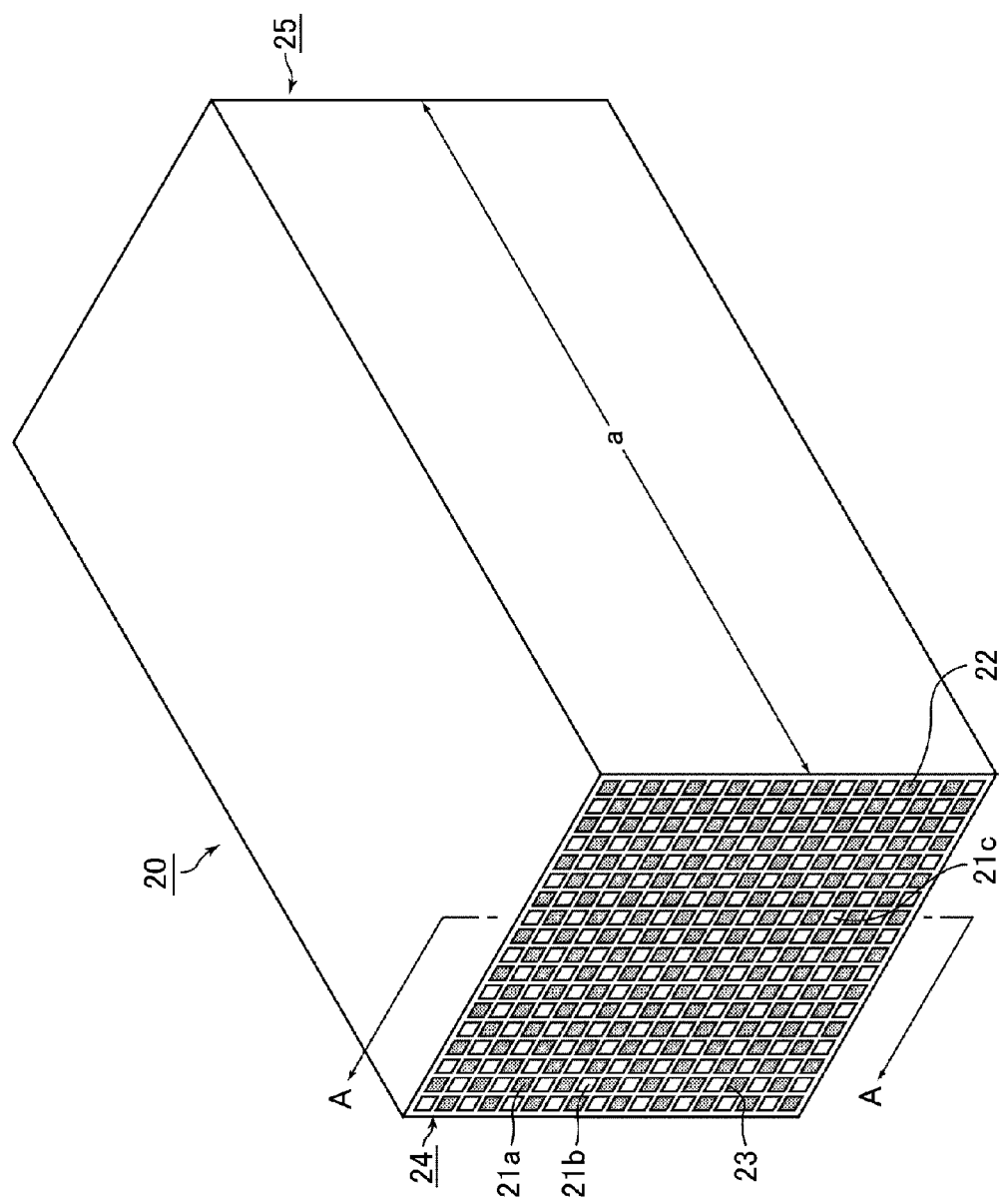
FIG. 2 is a perspective view schematically illustrating one example of a honeycomb fired body that configures the honeycomb filter illustrated in FIG. 1.
Figure 3A:
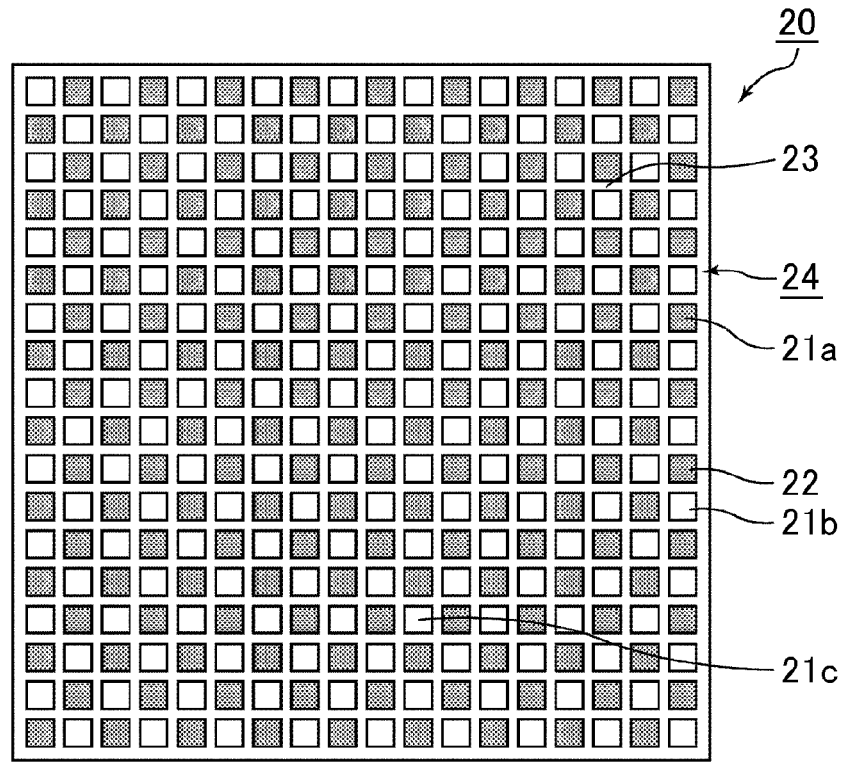
FIG. 3A is a side view schematically illustrating a cell structure of the honeycomb fired body illustrated in FIG. 2 as viewed from one end face side.
Figure 3B:
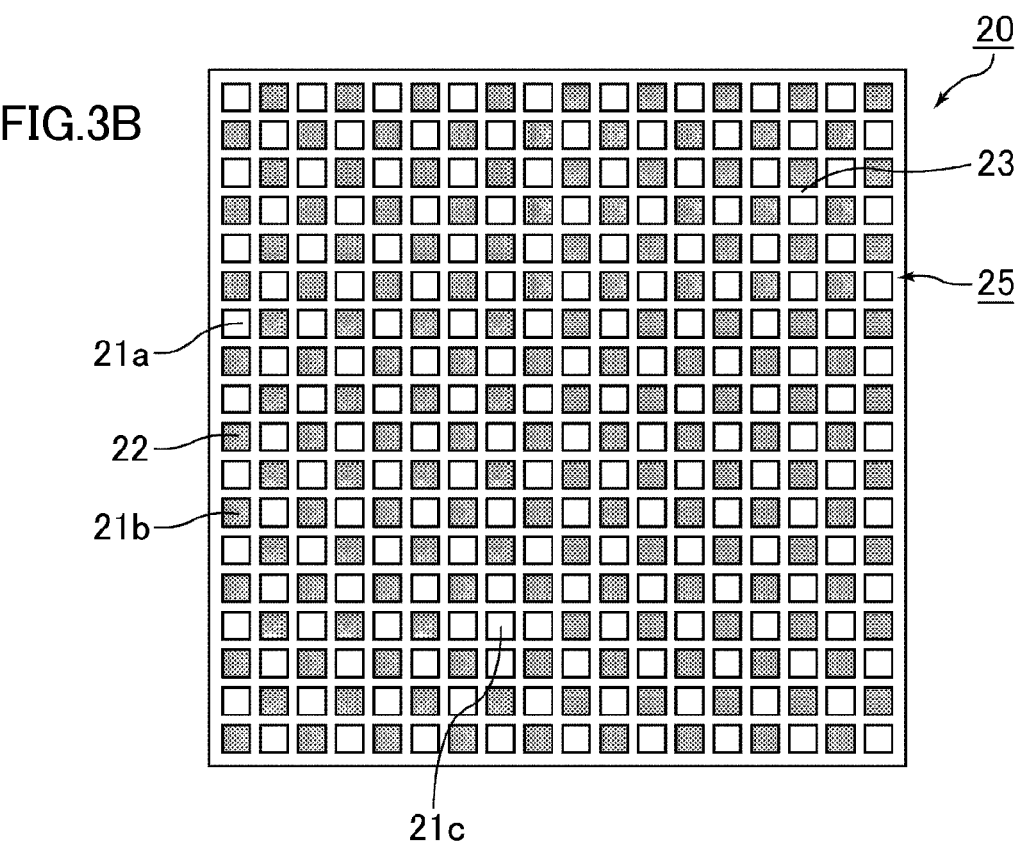
FIG. 3B is a side view schematically illustrating the cell structure of the honeycomb fired body illustrated in FIG. 2 as viewed from the other end face side.

FIG. 1 is a perspective view schematically illustrating one example of a honeycomb filter according to a first embodiment of the present invention. FIG. 2 is a perspective view schematically illustrating one example of a honeycomb fired body that configures the honeycomb filter illustrated in FIG. 1. FIG. 3A is a side view schematically illustrating a cell structure of the honeycomb fired body illustrated in FIG. 2 as viewed from one end face side, and FIG. 3B is a side view schematically illustrating the cell structure of the honeycomb fired body illustrated in FIG. 2 as viewed from the other end face side.

A honeycomb filter 10 illustrated in FIG. 1 has one end face 14 and the other end face 15.

A plurality of honeycomb fired bodies 20 made of porous ceramics are combined with one another with an adhesive layer 11 interposed therebetween to configure a ceramic block 13. A coat layer 12 is further formed on the periphery of the ceramic block 13 to prevent leakage of exhaust gases. Here, the coat layer may be formed if necessary.

Such a honeycomb filter formed by combining a plurality of honeycomb fired bodies is also referred to as an aggregated honeycomb filter.

The honeycomb fired body 20 has a shape illustrated in FIG. 2.

The honeycomb fired body 20 illustrated in FIG. 2 has one end face 24 and the other end face 25. In the honeycomb fired body 20, a plurality of cells 21a, 21b, and 21c are disposed in parallel with one another in a longitudinal direction (a direction shown by arrow "a" in FIG. 2) with a cell wall 23 interposed therebetween.

As illustrated in FIG. 3A, on the side of one end face 24 of the honeycomb fired body 20, the cell 21a, which has an end sealed with a plug 22, and the cell 21b or 21c, which has an open end, are alternately disposed.

As illustrated in FIG. 3B, the cell 21a has an open end on the side of the other end face 25 of the honeycomb fired body 20. On the other hand, among the cells that have an open end on the side of the one end face 24 of the honeycomb fired body 20, the cell 21b, which constitutes the majority of the cells, has an end sealed with the plug 22 on the side of the other end face 25 of the honeycomb fired body 20, and the cell 21c, which constitutes a part of the cells, has an open end on the side of the other end face 25 of the honeycomb fired body 20.

Therefore, the number of the cells having an open end on the side of the other end face 25 of the honeycomb filter 20 is larger than that of the cells having an open end on the side of the one end face 24 of the honeycomb filter 20 by the number of the open cell 21c.

Thus, a majority of the plurality of cells of the honeycomb fired body 20 are sealed cells, which are sealed at either one end of the honeycomb fired body 20, and a part of the plurality of cells of the honeycomb fired body 20 is an open cell, which is open at both ends of the honeycomb fired body 20. Specifically, in the honeycomb fired body 20 illustrated in FIGS. 2, 3A and 3B, the cells 21*a* and 21*b* are each the sealed cell, and the cell 21 is the open cell.

Like the cell 21*a*, a sealed cell that is sealed at an end on the side of the one end face 24 of the honeycomb fired body 20 is also referred to as a first sealed cell. Like the cell 21*b*, a sealed cell that is sealed at an end on the side of the other end face 25 of the honeycomb fired body 20 is also referred to as a second sealed cell.

In the embodiment of the present invention, the number of the sealed cells corresponds to a value calculated by subtracting the number of the open cell from the number of the plurality of cells of the honeycomb filter or the honeycomb fired body. Accordingly, in the present description, when the number of the open cell is from about 0.1% to about 4.9% of the number of the plurality of cells, for example, "a part of the plurality of cells" means "from about 0.1% to about 4.9% of the number of the plurality of cells", and "a majority of the plurality of cells" means "from about 95.1% to about 99.9% of the number of the plurality of cells."

In the honeycomb fired bodies that configure the honeycomb filter of the present embodiment, the open cell is disposed so that the number of the open cell in the entire honeycomb filter formed by combining a plurality of the honeycomb fired bodies with one another is from about 0.1% to about 4.9% of the number of the plurality of cells in the entire honeycomb filter. It is desired that the open cell is disposed so that the number of the open cell in the entire honeycomb filter is from about 0.2% to about 1.1% of the number of the plurality of cells in the entire honeycomb filter.

When the honeycomb fired body includes the open cell, the pressure loss can be more easily decreased compared with the case where the honeycomb fired body includes no open cell.

If the number of the open cell is about 0.1% or more of the number of the plurality of cells, the effect of decreasing the pressure loss will be more easily obtained. If the number of the open cell is about 4.9% or less, the pressure loss can be more easily decreased, and the capture efficiency of PM tends not to be reduced too much. As a result, the functions as the filter will be hardly deteriorated.

Particularly, when the number of the open cell is from about 0.2% to about 1.1% of the number of the plurality of cells, the pressure loss can be more easily decreased significantly without reducing the capture efficiency of PM.

For example, in a honeycomb filter formed by combining 16 pieces of honeycomb fired bodies each having 324 cells in 18 columns and 18 rows, as illustrated in FIGS. 2, 3A and 3B, it is desired that the honeycomb fired bodies include open cells so that the number of the open cells in the entire honeycomb filter is from about 5 pieces to about 220 pieces. In this case, one honeycomb fired body with the open cells may be combined with 15 pieces of honeycomb fired bodies with no open cell, or alternatively, a predetermined number of honeycomb fired bodies with a predetermined number of the open cell(s) may be combined with a predetermined number of honeycomb fired bodies with no open cell. Moreover, the number of the open cell(s) of the honeycomb fired body that configures the honeycomb filter maybe almost the same or different from one honeycomb fired body to another.

The following will mention flow of exhaust gases that flow into the honeycomb fired body according to an embodiment of the present invention.

Figure 4A:
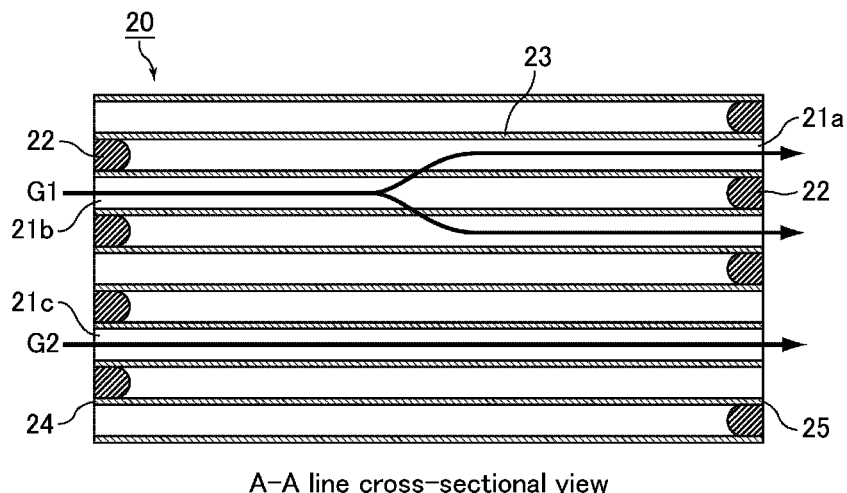
FIG. 4A is an A-A line cross-sectional view schematically illustrating flow of exhaust gases that flow into the honeycomb fired body illustrated in FIG. 2 from one end face side thereof.
Figure 4B:
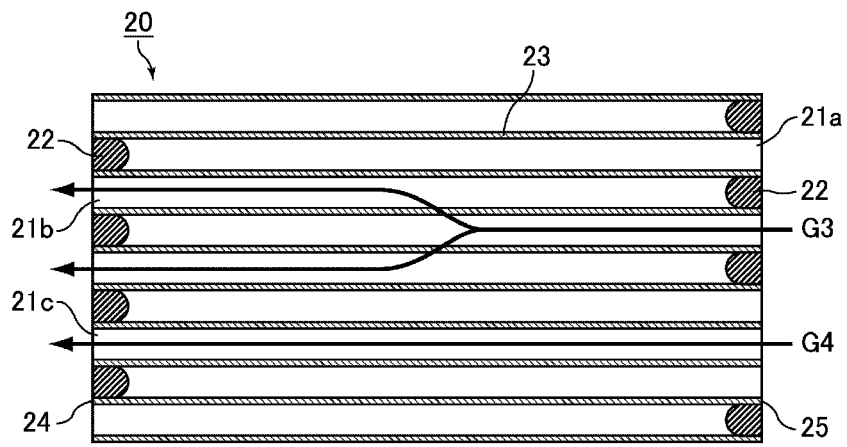
FIG. 4B is an A-A line cross-sectional view schematically illustrating flow of exhaust gases that flow into the honeycomb fired body illustrated in FIG. 2 from the other end face side thereof.

FIG. 4A is an A-A line cross-sectional view schematically illustrating flow of exhaust gases that flow into the honeycomb fired body illustrated in FIG. 2 from one end face side thereof, and FIG. 4B is an A-A line cross-sectional view schematically illustrating flow of exhaust gases that flow into the honeycomb fired body illustrated in FIG. 2 from the other end face side thereof.

In FIGS. 4A and 4B, the A-A line cross section of the honeycomb fired body 20 illustrated in FIG. 2 is schematically illustrated, and nine of the cells in the column direction of the honeycomb fired body 20 are schematically illustrated.

As illustrated in FIG. 4A, an exhaust gas G1 that flows into the second sealed cell 21*b* from the side of the one end face 24 of the honeycomb fired body 20 passes through the cell wall 23 that separates the first sealed cell 21*a* and the second sealed cell 21*b* to flow out from the first sealed cell 21*a*. Thus, the cell wall 23 functions as a filter for capturing PMs and the like.

On the other hand, an exhaust gas G2 that flows into the open cell 21*c* from the side of the one end face 24 of the honeycomb fired body 20 directly passes through the open cell 21*c*.

Further, as illustrated in FIG. 4B, an exhaust gas G3 that flows into the first sealed cell 21*a* from the side of the other end face 25 of the honeycomb fired body 20 passes through the cell wall 23 that separates the first sealed cell 21*a* and the second sealed cell 21*b* to flow out from the second sealed cell 21*b*. Thus, the cell wall 23 functions as a filter for capturing PMs and the like.

On the other hand, an exhaust gas G4 that flows into the open cell 21*c* from the side of the other end face 25 of the honeycomb fired body 20 directly passes through the open cell 21*c*.

Thus, among the exhaust gases that are introduced from the side of the end face 24 or 25 of the honeycomb fired body 20, the exhaust gases G1 and G3, which constitute the majority of the exhaust gases, pass through the cell wall 23, and the exhaust gases G2 and G4, which constitute some of the exhaust gases, directly pass through the open cell.

The honeycomb filter of the present embodiment is formed by combining the plurality of honeycomb fired bodies with one another with an adhesive layer interposed therebetween.

Among the plurality of honeycomb fired bodies, at least one honeycomb fired body is a honeycomb fired body including an open cell as a part of a plurality of cells, like the above-mentioned one. Accordingly, the honeycomb filter of the present embodiment may be formed by only honeycomb fired bodies each having an open cell as a part of a plurality of cells or may include a honeycomb fired body with no open cell.

Figure 5A:
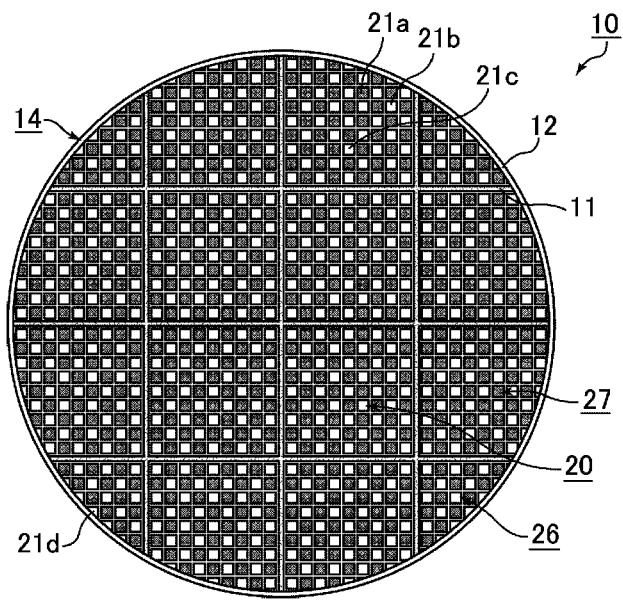
FIG. 5A is a side view schematically illustrating one example of the honeycomb filter according to the first embodiment of the present invention as viewed from one end face side.
Figure 5B:
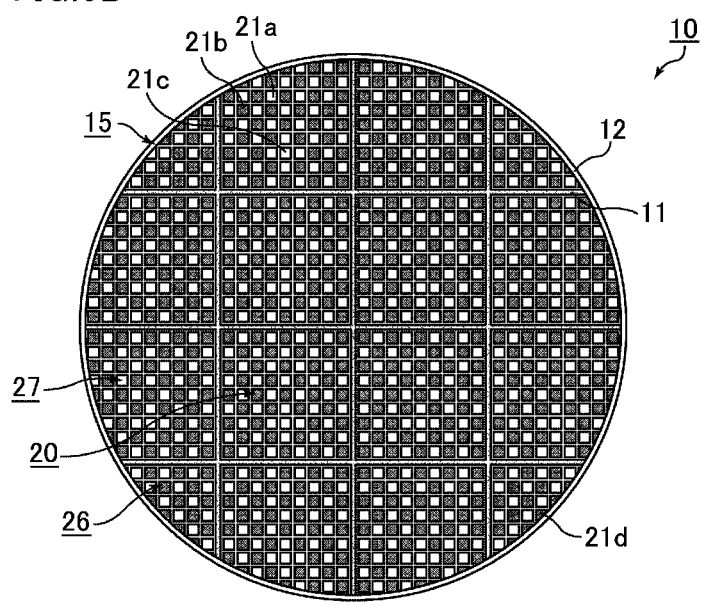
FIG. 5B is a side view schematically illustrating the honeycomb filter illustrated in FIG. 5A as viewed from the other end face side.

FIG. 5A is a side view schematically illustrating one example of the honeycomb filter according to the first embodiment of the present invention as viewed from one end face side, and FIG. 5B is a side view schematically illustrating the honeycomb filter illustrated in FIG. 5A as viewed from the other end face side.

In the honeycomb filter 10, a plurality of the honeycomb fired bodies 20 illustrated in FIGS. 2, 3A and 3B are combined with one another with the adhesive layer 11 interposed therebetween. In FIGS. 5A and 5B, nine of the cells in the column direction and nine of the cells in the row direction of the respective honeycomb fired bodies 20 are schematically illustrated.

In FIGS. 5A and 5B, the honeycomb fired bodies positioned at the outer peripheral part of the honeycomb filter 10 do not have a cross-sectional shape (shape at the cross-section perpendicular to the longitudinal direction of the honeycomb fired body) surrounded by four substantially straight lines, since the outer periphery of the honeycomb filter 10 is subjected to cutting, as mentioned below. Therefore, the honeycomb filter 10 can be considered to be formed by three kinds of honeycomb fired bodies: the honeycomb fired body 20 having a cross-sectional shape surrounded by four substantially straight lines; a honeycomb fired body 26 having a cross-sectional shape surrounded by two substantially straight lines and one curved line; and a honeycomb fired body 27 having a cross-sectional shape surrounded by three substantially straight lines and one curved line.

The honeycomb fired bodies 20, 26, and 27 that configure the honeycomb filter 10 are combined with one another such that the one end faces 24 (where the cell having a sealed end and the cell having an open end are alternately disposed) of the respective honeycomb fired bodies 20 illustrated in FIGS. 2, 3A and 3B are all in the same direction (the side of the one end face 14 of the honeycomb filter 10).

Therefore, the honeycomb filter 10 includes the first sealed cell 21a, the second sealed cell 21b, and the open cell 21c. The first sealed cell 21a has a sealed end on the side of the one end face 14 of the honeycomb filter 10 and an open end on the side of the other end face 15 of the honeycomb filter 10. The second sealed cell 21b has an open end on the side of the one end face 14 of the honeycomb filter 10 and a sealed end on the side of the other end face 15 of the honeycomb filter 10. The open cell 21c has open ends on the both sides of the honeycomb filter 10.

On the side of the one end face 14 of the honeycomb filter 10, the cell 21a having a sealed end and the cell 21b or 21c having an open end are alternately disposed.

On the other hand, the number of the cells having an open end on the side of the other end face 15 of the honeycomb filter 10 is larger than that of the cells having an open end on the side of the one end face 14 of the honeycomb filter 10 by the number of the open cell 21c.

The honeycomb filter of the present embodiment is characterized in that the number of the open cell is from about 0.1% to about 4.9% of the number of the plurality of cells. Further, the number of the open cell is desirably from about 0.2% to about 1.1% of the number of the plurality of cells.

In the present description, when the proportion of the number of the open cell in the number of the plurality of cells of the honeycomb filter is determined, the number of cells part of which has been cut by the below-mentioned cutting is not counted as the plurality of cells.

This is mentioned with reference to FIG. 5A. A cell 21d is a cell positioned at the outer peripheral part of the honeycomb filter 10 and has a cross section with a shape other than substantially quadrangle. Most of the cells like the cell 21d positioned at the outer peripheral part of the honeycomb filter 10 do not have a substantially quadrangular cross-sectional shape. On the other hand, the cells positioned at the part other than the outer peripheral part of the honeycomb filter 10 have a substantially quadrangular cross-sectional shape. Thus, the cells that are positioned at the outer peripheral part of the honeycomb filter and have a cross-sectional shape different from that of the cells at the part other than the outer peripheral part are referred to as a "partly-cut cell."

Accordingly, in the honeycomb filter illustrated in FIG. 5A, the number of the plurality of cells is the sum of the numbers of the sealed cell 21a, the sealed cell 21b, and the open cell 21c, each of which has a substantially quadrangular cross-sectional shape.

Next, the following description will discuss one example of a manufacturing method of the honeycomb filter of the present embodiment. A manufacturing method of the honeycomb filter illustrated in FIGS. 5A and 5B is mentioned below.

First, molding is carried out in which a pillar-shaped honeycomb molded body including a plurality of cells longitudinally disposed in parallel with one another with a cell wall interposed therebetween is manufactured by molding a ceramic raw material.

Specifically, first, a silicon carbide powder as a ceramic powder is mixed with an organic binder, a liquid plasticizer, a lubricant, and water to prepare a ceramic raw material (wet mixture) used for manufacturing a honeycomb molded body.

Next, the wet mixture is charged into an extruder and extrusion-molded, and the extrusion-molded body is then cut into a predetermined length to manufacture a raw honeycomb molded body having a predetermined shape.

Subsequently, the raw honeycomb molded body is dried with a microwave drying apparatus, a hot air drying apparatus, a dielectric drying apparatus, a reduced pressure drying apparatus, a vacuum drying apparatus, a freeze drying apparatus or the like to manufacture a dried honeycomb molded body.

Subsequently, sealing is carried out in which a plug material paste is filled into predetermined cells of the dried honeycomb molded body to seal the cells.

The sealing is mentioned by taking as an example the honeycomb fired body illustrated in FIGS. 2, 3A and 3B.

First, a plug material paste to be a plug for sealing is filled into ends of predetermined cells so that on the side of one end face of the honeycomb molded body, cells having a sealed end and cells having an open end are alternately disposed. Next, among cells whose ends on the one end face side of the honeycomb molded body have not been filled with the plug material paste, a majority of the cells are filled with the plug material paste at the end on the other end face side, and a part of the cells is not filled with the plug material paste at the end on the other end face side, either. Further, the cells that have been filled with the plug material paste at the end on the one end face side of the honeycomb molded body is not filled with the plug material paste at the end on the other end face side.

Here, plug material pastes having the same composition as in the above-mentioned wet mixture can be used.

Next, firing is carried out in which a honeycomb fired body is manufactured by firing the sealed honeycomb molded body.

After the sealing, degreasing is carried out in which organic matters of the honeycomb molded body with the sealed cells are removed by being heated in a degreasing furnace. Subsequently, firing is carried out to manufacture a honeycomb fired body like the one illustrated in FIGS. 2, 3A and 3B.

The plug material paste filled into the end of the cell is fired by heating to become a plug.

As the conditions of the cutting, drying, sealing, degreasing, and firing, conventional conditions employed in manufacturing a honeycomb fired body can be applied.

Subsequently, combining is carried out in which an adhesive layer is formed between a plurality of the honeycomb fired bodies and combining the plurality of honeycomb fired bodies with one another with the adhesive layer interposed therebetween.

Figure 6:
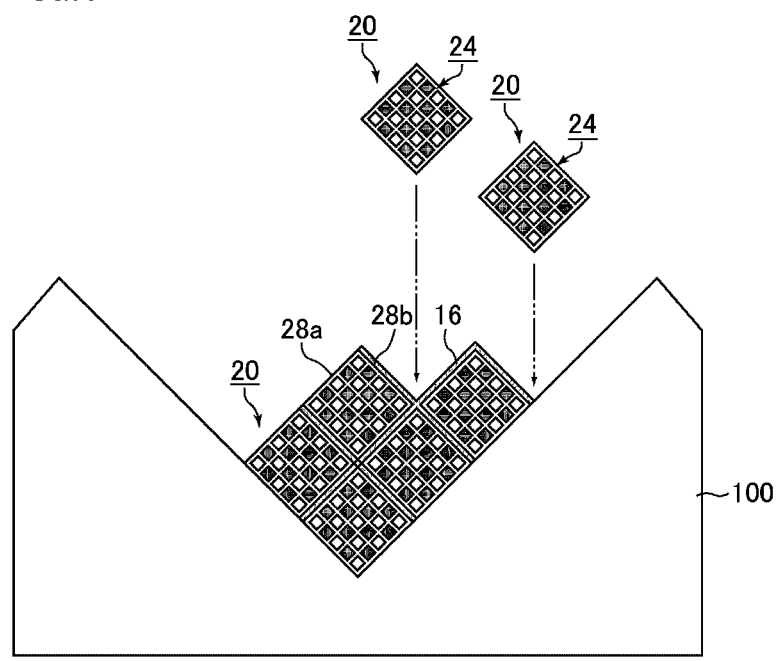
FIG. 6 is a side view schematically illustrating one example of combining upon manufacturing the honeycomb filter illustrated in FIGS. 5A and 5B.

FIG. 6 is a side view schematically illustrating one example of the combining upon manufacturing of the honeycomb filter illustrated in FIGS. 5A and 5B.

In the combining, for example, as illustrated in FIG. 6, first, the honeycomb fired body 20 is placed obliquely on a stand 100 whose top face is inclined like a letter V so that the honeycomb fired body 20 can be obliquely piled up. Thereafter, an adhesive paste 16 is applied in a uniform thickness to two upturned side faces 28a and 28b of the honeycomb fired body 20. Then, another honeycomb fired body 20 is piled up in turn on the adhesive paste 16 and this operation is repeated. In this case, the honeycomb fired bodies 20 are laminated so that the one end faces 24 where the cells having a sealed end and the cells having an open end are alternately disposed of the respective honeycomb fired bodies are all in the same direction.

Through the above-mentioned processes, an aggregated body of the honeycomb fired bodies manufactured by applying the adhesive paste to side faces of each honeycomb fired body is manufactured.

In FIG. 6, five of the cells in the column direction and five of the cells in the row direction of the respective honeycomb fired bodies 20 are schematically illustrated.

Examples of the adhesive paste include a paste including: inorganic fibers such as alumina fiber; inorganic particles such as silica carbide; and an inorganic binder such as silica sol. The adhesive paste may further include whiskers.

Subsequently, drying and solidifying are carried out in which the aggregated body of the honeycomb fired bodies is heated with a drying apparatus and the like to dry and solidify the adhesive paste to manufacture a ceramic block including an adhesive layer interposed between the honeycomb fired bodies.

Thereafter, periphery-cutting is carried out in which the ceramic block is subjected to cutting.

Specifically, the ceramic block is subjected to cutting with a diamond cutter, thereby preparing a ceramic block whose outer periphery has been cut into a substantially round pillar shape.

Subsequently, coat layer forming is carried out in which a coat layer is formed by applying a coating material paste to the outer peripheral face of the ceramic block, whose periphery has been cut into a substantially round pillar shape, and by drying and solidifying the coating material paste.

First, the coating material paste is applied to the outer peripheral face of the ceramic block, whose periphery has been cut into a substantially round pillar shape. Next, the coating material paste is dried and solidified to manufacture a honeycomb filter including the coating layer on its outer peripheral face.

Here, pastes including the same material as that of the adhesive paste can be used as the coating material paste.

Through the above-mentioned processes, the honeycomb filter of the present embodiment (see FIGS. 5A and 5B) can be manufactured.

The following will mention an exhaust gas purifying apparatus in accordance with an embodiment of the present invention.

The exhaust gas purifying apparatus of the present embodiment includes the above-mentioned honeycomb filter according to the embodiment of the present invention.

Figure 7:
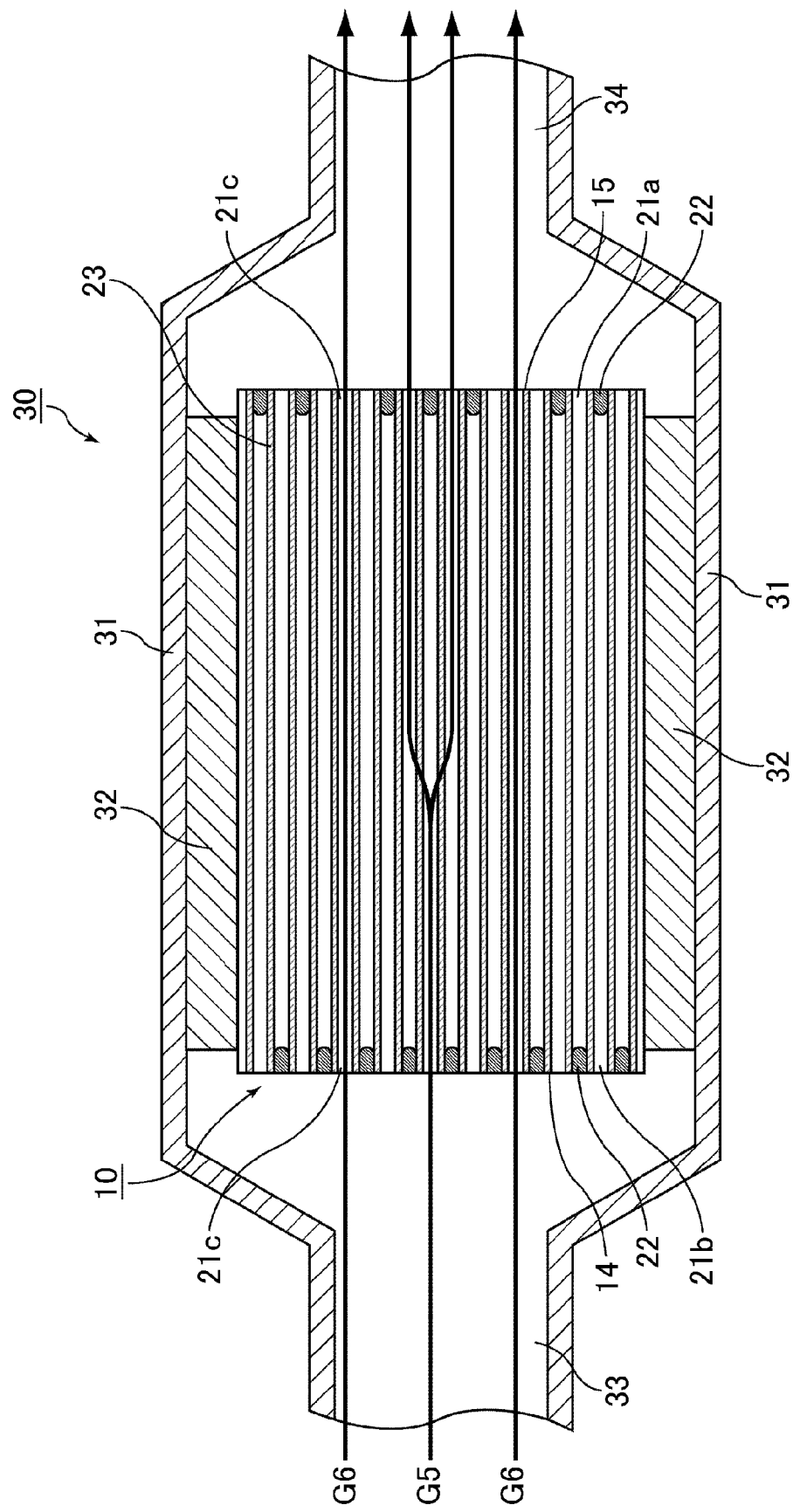
FIG. 7 is a cross-sectional view schematically illustrating one example of an exhaust gas purifying apparatus according to an embodiment of the present invention.

FIG. 7 is a cross-sectional view schematically illustrating one example of an exhaust gas purifying apparatus according to the embodiment of the present invention.

An exhaust gas purifying apparatus 30 illustrated in FIG. 7 includes: a metal casing 31 provided with a gas inlet side 33 and a gas outlet side 34; and a honeycomb filter 10 installed in the metal casing 31.

In the exhaust gas purifying apparatus 30, the honeycomb filter illustrated in FIGS. 5A and 5B is employed as the honeycomb filter 10. As mentioned above, on the side of the one end face 14 of the honeycomb filter 10, the cell 21a having an end sealed with the plug 22 and the cell 21b or 21c having an open end are alternately disposed. On the other hand, the number of the cells having an open end, which exist on the side of the other end face 15 of the honeycomb filter 10, is larger than that of the cells having an open end, which exist on the side of the one end face 14 of the honeycomb filter 10, by the number of the open cell 21c. In the exhaust gas purifying apparatus 30, the one end face 14 of the honeycomb filter 10 is disposed on the gas inlet side 33 of the metal casing 31, and the other end face 15 of the honeycomb filter 10 is disposed on the gas outlet side 34 of the metal casing 31.

A holding sealing material 32 is provided between the honeycomb filter 10 and the metal casing 31. The holding sealing material 32 holds the honeycomb filter 10.

The holding sealing material is a mat-like member having a substantially quadrangular shape in a plan view and mainly including inorganic fibers such as alumina.

An introducing pipe is coupled to the gas inlet side 33 of the metal casing 31. The introducing pipe is configured to introduce exhaust gases emitted from internal combustion engines, such as a direct injection gasoline engine, into the exhaust gas purifying apparatus 30. On the other hand, an exhaust pipe is coupled to the gas outlet side 34 of the metal casing 31. The exhaust pipe is configured to discharge the exhaust gas that has passed through the exhaust gas purifying apparatus 30 to the outside.

The following will mention a process for purifying exhaust gases with such an exhaust gas purifying apparatus 30 including the honeycomb filter 10 with reference to FIG. 7.

As illustrated in FIG. 7, exhaust gases (in FIG. 7, exhaust gases are indicated by G5 and G6, and the flow of the exhaust gases are indicated by an arrow) emitted from an internal combustion engine and flowing into the exhaust gas purifying apparatus 30 from the gas inlet side 33 flow into the honeycomb filter 10 from the side of the one end face 14 of the honeycomb filter 10. On the side of the one end face 14 of the honeycomb filter 10, the exhaust gas G5 flows into the second sealed cell 21b, and the exhaust gas G6 flows into the open cell 21c.

The exhaust gas G5, which has flowed into the second sealed cell 21b, passes through the cell wall 23 that separates the first sealed cell 21a and the second sealed cell 21b. In this case, PMs in the exhaust gas G5 are captured by the cell wall 23 to purify the exhaust gas G5.

The purified exhaust gas G5 flows into the first sealed cell 21a, and is discharged outside of the honeycomb filter 10 from the side of the other end face 15 of the honeycomb filter 10. Then, the exhaust gas G5 is discharged outside of the exhaust gas purifying apparatus 30 from the gas outlet side 34 of the exhaust gas purifying apparatus 30.

The exhaust gas G6, which has flowed into the open cell 21c, directly passes through the open cell 21c, and is discharged outside of the honeycomb filter 10 from the side of the other end face 15 of the honeycomb filter 10. Then, the exhaust gas G6 is discharged outside of the exhaust gas purifying apparatus 30 from the gas outlet side 34 of the exhaust gas purifying apparatus 30.

Thus, in the exhaust gas purifying apparatus 30, the exhaust gas G5, which constitutes the majority of the exhaust gases, is purified. On the other hand, the exhaust gas G6, which constitutes some of the exhaust gases, passes through the open cell 21c. Therefore, the exhaust gas purifying apparatus 30 tends to provide a lower pressure loss compared with an exhaust gas purifying apparatus including a honeycomb filter with no open cell.

In the exhaust gas purifying apparatus 30, the open cell exists in a specific proportion relative to the number of the plurality of cells in the entire honeycomb filter 10, so that the pressure loss can be more easily decreased significantly without any appreciable reduction in capture efficiency of PM.

Accordingly, the exhaust gas purifying apparatus of the present embodiment can be used as a gasoline particulate filter for purifying exhaust gases emitted from gasoline engines.

In the exhaust gas purifying apparatus of the present embodiment, the honeycomb filter of the present embodiment may be housed singly in the metal casing, or may be housed therein together with a honeycomb structure used as another catalyst carrier.

Next, a method for manufacturing the exhaust gas purifying apparatus of the present embodiment will be described.

The honeycomb filter of the present embodiment, manufactured by the above-mentioned method, is disposed inside the metal casing. For example, when the exhaust gas purifying apparatus illustrated in FIG. 7 is manufactured, the honeycomb filter is disposed in the metal casing so that the one end face where the cells having a sealed end and the cells having an open end are alternately disposed is disposed on the gas inlet side of the metal casing and the other end face is disposed on the gas outlet side of the metal casing.

Specifically, a mat having a substantially quadrangular shape in a plan view and mainly including inorganic fibers is prepared as a holding sealing material, and the mat is wound around the honeycomb filter. It is possible to form an exhaust gas purifying apparatus by press-fitting the honeycomb filter with the mat in a substantially cylindrical metal casing.

Alternatively, with the metal casing separable into two parts, a first metal casing and a second metal casing, the honeycomb filter around which a mat including inorganic fibers has been wound is placed on the first metal casing, and the second metal casing is placed on the honeycomb filter, and thereby the casings are sealed to provide an exhaust gas purifying apparatus.

Hereinafter, the effects of the honeycomb filter and the exhaust gas purifying apparatus according to the present embodiment will be mentioned.

(1) In the honeycomb filter of the present embodiment, a majority of the plurality of cells of the honeycomb filter are sealed cells sealed at either one end, and a part of the plurality of cells is an open cell open at both ends.

When the honeycomb filter includes an open cell open at both ends as a part of the plurality of cells, some of exhaust gases pass through the open cell, and therefore, such a honeycomb filter can more easily decrease the pressure loss compared with a honeycomb filter with no open cell.

(2) In the honeycomb filter of the present embodiment, the number of the open cell is from about 0.1% to about 4.9% of the number of the plurality of cells of the honeycomb filter.

When the number of the open cell is from about 0.1% to about 4.9% of the number of the plurality of cells, the pressure loss can be more easily decreased significantly without any appreciable reduction in capture efficiency of PM.

(3) In the honeycomb filter of the present embodiment,
on the side of the one end face, the cells having a sealed end and the cells having an open end are alternately disposed,
the cells having a sealed end on the side of the one end face each have an open end on the side of the other end face,
a majority of the cells having an open end on the side of the one end face have a sealed end on the side of the other end face, and
a part of the cells having an open end on the side of the one end face has an open end on the side of the other end face.

Specifically, in the honeycomb filter of the present embodiment, more cells having an open end exist on the side of the other end face than on the side of the one end face. Therefore, the exhaust gases can more smoothly flow into the honeycomb filter, so that the pressure loss can be more easily decreased further.

(4) The exhaust gas purifying apparatus of the present embodiment includes the honeycomb filter of the present embodiment. The honeycomb filter is disposed such that the one end face where the cells having a sealed end and the cells having an open end are alternately disposed is disposed on the gas inlet side, and the other end face of the honeycomb filter is disposed on the gas outlet side.

Specifically, in the exhaust gas purifying apparatus of the present embodiment, more cells having an open end exist on the gas outlet side than on the gas inlet side. Therefore, the exhaust gases can more smoothly flow into the honeycomb filter, so that the pressure loss can be more easily decreased significantly.

(5) The exhaust gas purifying apparatus of the present embodiment purifies exhaust gases emitted from gasoline engines.

The amount of PMs contained in exhaust gases emitted from gasoline engines is smaller than that contained in exhaust gases emitted from diesel engines. Therefore, use of the exhaust gas purifying apparatus of the present embodiment, which includes the honeycomb filter capable of more easily decreasing the pressure loss significantly without any appreciable reduction in capture efficiency of PM, allows easier prevention of deterioration of fuel economy resulting from an increase in pressure loss and sufficient capturing of PMs contained in the exhaust gases.

(6) In the exhaust gas purifying apparatus of the present embodiment, a single honeycomb filter is disposed in the metal casing.

When the exhaust gas purified apparatus of the present embodiment is used to purify exhaust gases emitted from gasoline engines, the exhaust gases contain PMs in a small amount, and therefore, the PMs can be sufficiently captured more easily even by the single honeycomb filter.

Moreover, there is no need to house a plurality of honeycomb filters in the metal casing, and therefore, the entire exhaust gas purifying apparatus can be more easily downsized.

EXAMPLES

The following description will discuss Examples that more specifically disclose the first embodiment of the present invention, and the present invention is not intended to be limited only by these Examples.

(1) Manufacture of Honeycomb Filter

Example 1

An amount of 52.8% by weight of coarse powder of silicon carbide having an average particle diameter of 22 μm and 22.6% by weight of fine powder of silicon carbide having an average particle diameter of 0.5 μm were mixed. To the resulting mixture, 2.1% by weight of acrylic resin, 4.6% by weight of an organic binder (methyl cellulose), 2.8% by weight of a lubricant (UNILUB, made by NOF Corporation), 1.3% by weight of glycerin, and 13.8% by weight of water were added, and then kneaded to prepare a wet mixture. The wet mixture was extrusion-molded and then cut, so that a raw honeycomb molded body having substantially the same shape as that illustrated in FIGS. 2, 3A and 3B and having cells not sealed was manufactured. Next, the raw honeycomb molded body was dried with a microwave drying apparatus to obtain a dried honeycomb molded body.

A plug material paste having the same composition as that of the above-mentioned wet mixture was then filled into predetermined cells of the dried honeycomb molded body, thereby sealing the cells.

In the present Example, as mentioned below, a first honeycomb fired body with one open cell and a second honeycomb fired body with no open cell were manufactured. Then, the honeycomb molded body that is to constitute the first honeycomb fired body was subjected to a first sealing, and the honeycomb molded body that is to constitute the second honeycomb fired body to a second sealing.

In the first sealing, first, the plug material paste was filled into ends of predetermined cells so that on the side of one end face of the dried honeycomb molded body, cells having a sealed end and cells having an open end are alternately disposed. Next, among cells whose ends on the one end face side of the dried honeycomb molded body had not been filled with the plug material paste, one cell was not filled with the plug material paste at the end on the other end face side, either, and the other cells were filled with the plug material paste at the ends on the other end face side. Further, the cells whose ends on the one end face side of the dried honeycomb molded body had been filled with the plug material paste were not filled with the plug material paste at the ends on the other end face side of the dried honeycomb molded body.

In the second sealing, first, the plug material paste was filled into ends of predetermined cells so that cells having a sealed end and cells having an open end are alternately disposed on the one end face side of the dried honeycomb molded body. Next, all the cells whose ends on the one end face side of the dried honeycomb molded body had not been filled with the plug material pate were filled with the plug material paste at the ends on the other end face side of the dried honeycomb molded body.

After the sealing for the cells, the honeycomb molded body having been filled with the plug material paste was dried again with the drier.

The honeycomb molded body in which the cells were sealed was placed on a firing jig, and then degreased at 400° C. Thereafter, the degreased honeycomb molded body was fired at 2200° C. under a normal-pressure argon atmosphere for 3 hours to manufacture first and second honeycomb fired bodies made of a silicon carbide sintered body. The manufactured honeycomb fired bodies had a porosity of 42%, an average pore diameter of 11 μm, a size of 34.3 mm×34.3 mm×150 mm, the number of cells (cell density) of 31.0 pcs/cm$^2$ (200 pcs/inch$^2$) and a thickness of the cell wall of 0.4 mm (16 mil).

The cell structure of the first honeycomb fired body which was subjected to the first sealing is the same as that illustrated in FIGS. 3A and 3B, and one open cell existed in the cell structure.

On the other hand, the cell structure of the second honeycomb fired body which was subjected to the second sealing is the same as that illustrated in FIG. 3A on the both end face sides of the honeycomb fired body. The cells having a sealed end and the cells having an open end are alternately disposed.

In the respective Examples and Comparative Examples, like the first-sealed honeycomb fired body, a honeycomb fired body with the open cell is referred to as a first honeycomb fired body; and, like the second-sealed honeycomb fired body, a honeycomb fired body with no open cell is referred to as a second honeycomb fired body.

Next, prepared was a heat-resistant adhesive paste containing 30.0% by weight of an alumina fiber having an average fiber length of 20 μm and an average fiber diameter of 2 μm, 21% by weight of a silicon carbide powder having an average particle diameter of 0.6 μm, 15% by weight of silica sol (solids content: 30% by weight), 5.6% by weight of carboxymethyl cellulose and 28.4% by weight of water.

Then, using 5 pieces of the first honeycomb fired bodies and 11 pieces of the second honeycomb fired bodies, an aggregated body of the honeycomb fired bodies was manufactured by, as illustrated in FIG. 6, combining 16 pieces of the first and second honeycomb fired bodies in 4 columns and 4 rows with one another with the adhesive paste applied to side faces of the honeycomb fired bodies.

Figure 8:
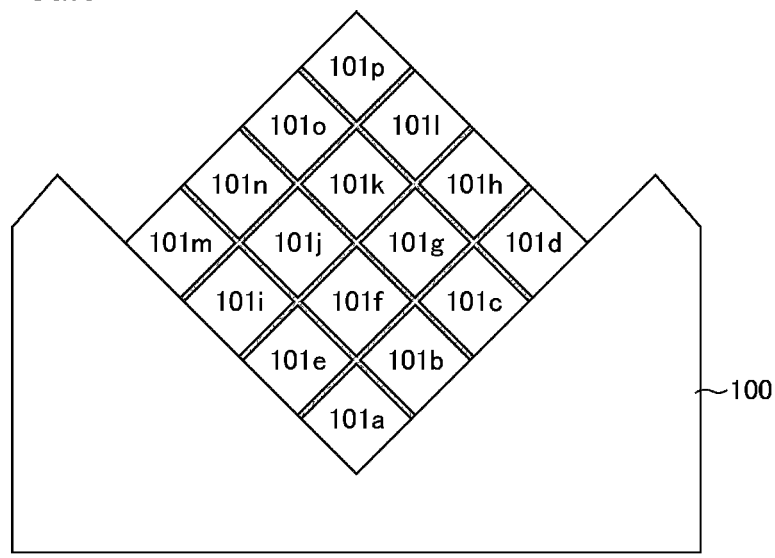
FIG. 8 is an explanatory view schematically illustrating the arrangement position of first honeycomb fired bodies and second honeycomb fired bodies in the combining upon manufacturing the honeycomb filter illustrated in FIGS. 5A and 5B.

FIG. 8 is an explanatory view schematically illustrating the arrangement position of the first honeycomb fired bodies and the second honeycomb fired bodies in the combining upon manufacturing the honeycomb filter illustrated in FIGS. 5A and 5B.

When the positions of 16 pieces of the honeycomb fired bodies that configure the aggregated body of the honeycomb fired bodies are defined as 101*a* to 101*p* as illustrated in FIG. 8, the first and second honeycomb fired bodies were laminated so that the first honeycomb fired bodies were disposed at positions 101*f*, 101*g*, 101*j*, 101*k*, and 101*o*, and the second honeycomb fired bodies were disposed at the other positions (101*a* to 101*e*, 101*h*, 101*i*, 101*l* to 101*n*, and 101*p*).

The first honeycomb fired bodies were laminated so that the end faces where the cells having a sealed end and the cells having an open end are alternately disposed of the respective first honeycomb fired bodies were all in the same direction.

Successively, the aggregated body of the honeycomb fired bodies was heated at 120° C. to dry and solidify the adhesive paste. Thereby, a ceramic block provided with an adhesive layer with a thickness of 1.0 mm and having a rectangular pillar shape was manufactured.

Subsequently, the outer periphery of the ceramic block was cut with a diamond cutter to manufacture a ceramic block whose outer periphery was cut into a round pillar shape.

Next, a coating material paste was applied to the outer peripheral face of the ceramic block whose outer periphery was cut into a round pillar shape to form a coating material paste layer. Then, the coating material paste layer was dried and solidified at 120° C. to form a coat layer, and thereby, a honeycomb filter that has a round pillar shape of 143.8 mm in diameter and 150 mm in length and is provided with the coat layer on the outer peripheral face thereof was manufactured.

Here, a paste having the same composition as that of the above-mentioned adhesive paste was used as the coating material paste.

The honeycomb filter manufactured in Example 1 included five open cells. The number of the open cells was 0.1% of the number of the plurality of cells (about 4500 cells) of the honeycomb filter.

Example 2

First, by using the same method as in Example 1, a first honeycomb fired body with one open cell and a second honeycomb fired body with no open cell were manufactured.

Next, using 10 pieces of the first honeycomb fired bodies and 6 pieces of the second honeycomb fired bodies, an aggregated body of the honeycomb fired bodies was manufactured by the same method as in Example 1. In this case, the first and second honeycomb fired bodies were laminated so that the first honeycomb fired bodies were disposed at positions 101*b*, 101*e* to 101*l* and 101*o* and the second honeycomb fired bodies were disposed at the other positions (101*a*, 101*c*, 101*d*, 101*m*, 101*n*, and 101*p*) in FIG. 8.

Subsequently, a honeycomb filter was manufactured in the same manner as in Example 1.

The number of the open cells of the honeycomb filter manufactured in Example 2 was 10. The proportion of the number of the open cells was 0.2% relative to the number of the plurality of cells (about 4500 cells) of the honeycomb filter.

Examples 3 to 7

Honeycomb filters were manufactured in the same manner as in Example 2, except that the number of the open cells of the honeycomb filter and the proportion of the number of the open cells in the number of the plurality of cells of the honeycomb filter were changed by changing the number of the open cell of the first honeycomb fired body as shown in Table 1.

The proportions of the number of the open cells of Examples 3 to 7 were 1.1%, 2.2%, 3.3%, 4.4%, 4.9%, respectively, relative to the number of the plurality of cells (about 4500 cells) of the honeycomb filter.

Comparative Example 1

First, by using the same method as in Example 1, a first honeycomb fired body with 23 open cells and a second honeycomb fired body with no open cell were manufactured.

Next, an aggregated body of the honeycomb fired bodies was manufactured in the same manner as in Example 2, using 10 pieces of the first honeycomb fired bodies and 6 pieces of the second honeycomb fired bodies.

Subsequently, a honeycomb filter was manufactured in the same manner as in Example 1.

The honeycomb filter manufactured in Comparative Example 1 included 230 open cells. The proportion of the number of the open cells was 5.1% relative to the number of the plurality of cells (about 4500 cells) of the honeycomb filter.

Comparative Example 2

A honeycomb filter was manufactured in the same manner as in Example 1, except that an aggregated body of honeycomb fired bodies was manufactured using 16 pieces of the second honeycomb fired bodies without using the first honeycomb fired body.

In the honeycomb filter manufactured in Comparative Example 2, all the cells were sealed at alternate ends and no open cells existed. Specifically, the proportion of the number of the open cell was 0% relative to the number of the plurality of cells (about 4500) of the honeycomb filter.

(2) Evaluation on Characteristics of Honeycomb Filter

The honeycomb filters manufactured in Examples 1 to 7 and Comparative Examples 1 and 2 were evaluated for capture efficiency of PM and pressure loss.

For evaluation of the capture efficiency of PM and the pressure loss, exhaust gas purifying apparatuses including the honeycomb filter manufactured in any of Examples 1 to 7 and Comparative Examples 1 and 2 were manufactured, and the capture efficiency of PM and the pressure loss were measured using these apparatuses.

(2-1) Manufacture of Exhaust Gas Purifying Apparatus

Exhaust gas purifying apparatuses were manufactured by winding a mat-like holding sealing material including alumina around the honeycomb filter manufactured in any of Examples 1 to 7 and Comparative Examples 1 and 2 and disposing the filter with the holding sealing material in a metal casing.

Upon disposing the honeycomb filter manufactured in any of Examples 1 to 7 and Comparative Example 1 in the metal casing, the honeycomb filter was disposed so that the one end face where the cells having a sealed end and the cells having an open end are alternately disposed was disposed on the gas inlet side of the metal casing, and the other end face was disposed on the gas outlet side of the metal casing.

(2-2) Measurement of Capture Efficiency of PM

Figure 9:
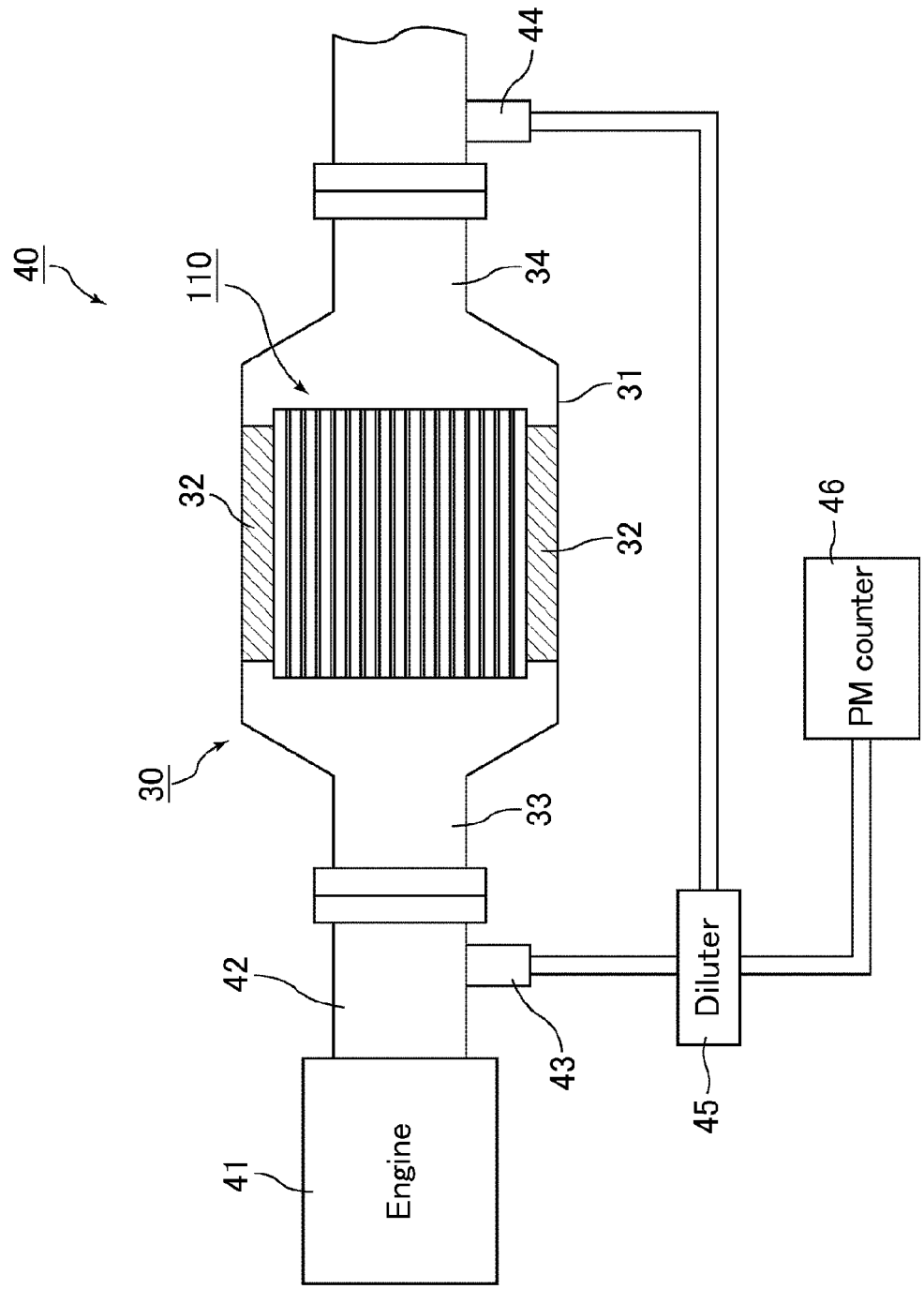
FIG. 9 is a cross-sectional view schematically illustrating a PM-capturing efficiency measuring apparatus according to an embodiment of the present invention.

A capture efficiency of PM was measured using a PM-capturing efficiency measuring apparatus as illustrated in FIG. 9. FIG. 9 is a cross-sectional view schematically illustrating a PM-capturing efficiency measuring apparatus according to an embodiment of the present invention.

In this PM-capturing efficiency measuring apparatus 40, the gas inlet side 33 of the exhaust gas purifying apparatus 30 is coupled to an exhaust gas pipe 42 of 1.6 liters of a common-rail-type diesel engine 41. The PM-capturing efficiency measuring apparatus 40 is configured as a scanning mobility particle sizer (SMPS) that is provided with: a sampler 43 used for sampling exhaust gases before passing through a honeycomb filter 110; a sampler 44 used for sampling the exhaust gases after passing through the honeycomb filter 110; a diluter 45 used for diluting the exhaust gases sampled by the sampler 43 or 44; and a PM counter 46 (a condensation particle counter 3022A-S, manufactured by TSI, Inc.) used for measuring the amount of PMs contained in the diluted exhaust gases.

The measurement of the capture efficiency of PM was carried out using a diesel engine, where the amount of PMs in the exhaust gases is large, so as to shorten the measurement time and achieve the measurement with accuracy.

The engine 41 was driven for 2 hours at the number of revolutions of 2500 $min^{-1}$ and a torque of 40 Nm, and the exhaust gases from the engine 41 were allowed to flow into the honeycomb filter 110. At this time, the amount of PMs "$P_0$" in the exhaust gases before passing through the honeycomb filter 110 and the amount of PMs "$P_1$" in the exhaust gases after passing through the honeycomb filter 110 were confirmed based upon the number of PM particles counted with the PM counter 46. Then, the capture efficiency of PM was calculated using the following equation (1):

$$\text{Capture efficiency of PM (\%)} = (P_0 - P_1)/P_0 \times 100 \qquad (1)$$

Table 1 shows the measurement results of the capture efficiency of PM.

(2-3) Measurement of Pressure Loss

Figure 10:
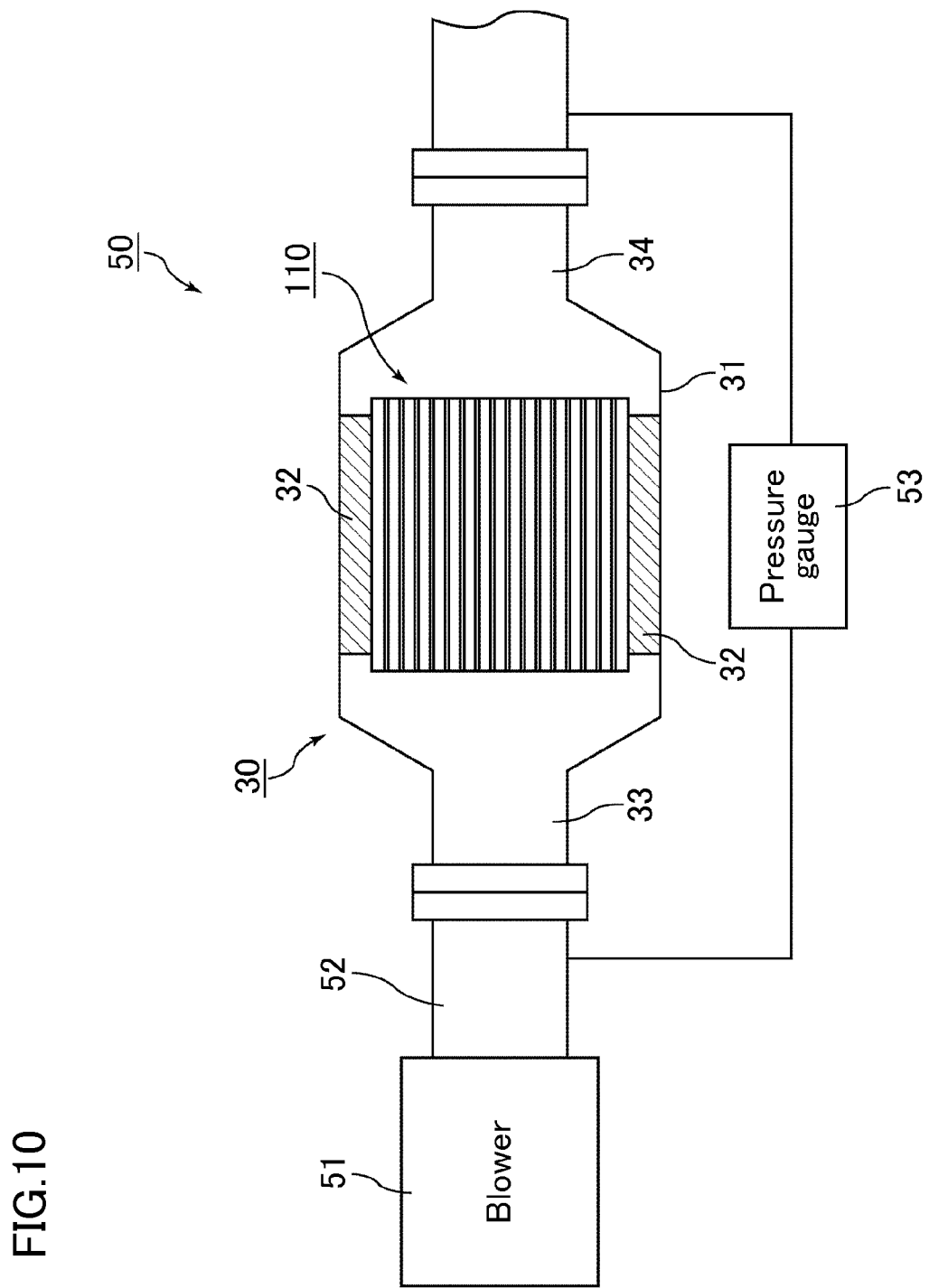
FIG. 10 is a cross-sectional view schematically illustrating a pressure loss measuring apparatus according to an embodiment of the present invention.

A pressure loss was measured with a pressure loss measuring apparatus as illustrated in FIG. 10. FIG. 10 is a cross-sectional view schematically illustrating a pressure loss measuring apparatus according to an embodiment of the present invention.

In a pressure loss measuring apparatus 50, the gas inlet side 33 of the exhaust gas purifying apparatus 30 is coupled to an exhaust gas pipe 52 of a blower 51, and a pressure gauge 53 is attached so as to detect pressures before and after passing through the honeycomb filter 110.

Here, the blower 51 was driven so that the flow rate of gases (air) was 750 $m^3/h$, and after 5 minutes from the start of the driving operation, a pressure difference (pressure loss) was measured.

Table 1 shows the measurement results of the pressure loss.

Table 1 collectively shows: the number of the open cell of the first honeycomb fired body; the numbers of the first honeycomb fired bodies and the second honeycomb fired bodies that configure the aggregated body of the honeycomb fired bodies; the number of the open cells of the honeycomb filter; the proportion of the number of the open cells in the number of the plurality of cells of the honeycomb filter; the measurement result of the capture efficiency of PM; and the measurement result of the pressure loss, of the honeycomb filters of Examples 1 to 7 and Comparative Examples 1 and 2.

Figure 11:
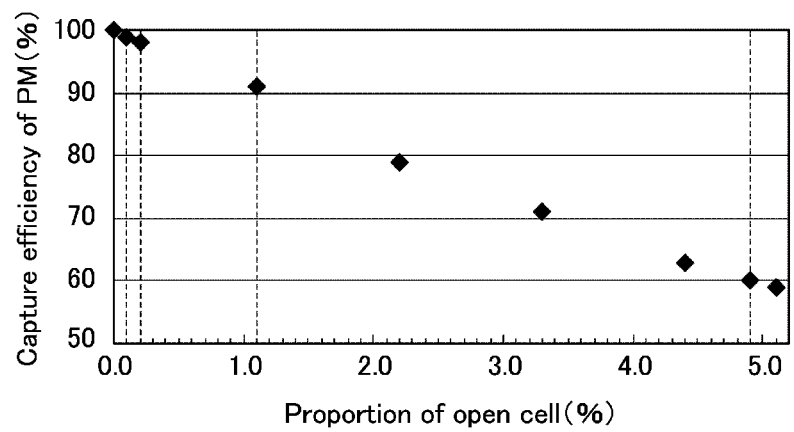
FIG. 11 is a graph showing a relationship between capture efficiency of PM and a proportion of the number of open cells in the number of a plurality of cells of a honeycomb filter in Examples and Comparative Examples.

Further, the graph of FIG. 11 shows the relationship between the capture efficiency of PM and the proportion of the number of the open cells in the number of the plurality of cells of the honeycomb filter, which was determined based on the measurement results of the capture efficiency of PM in Examples 1 to 7 and Comparative Examples 1 and 2. Moreover, the graph of FIG. 12 shows the relationship between the pressure loss and the proportion of the number of the open cells in the number of the plurality of cells of the honeycomb filter, which was determined based on the measurement results of the pressure loss in Examples 1 to 7 and Comparative Examples 1 and 2.

Figure 12:
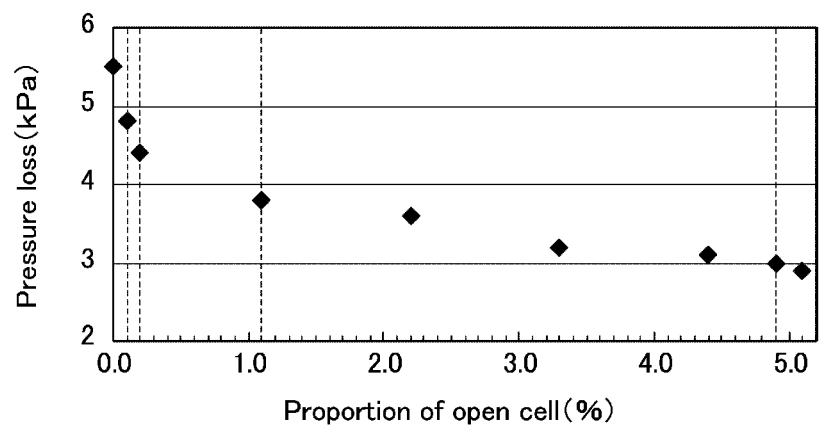
FIG. 12 is a graph showing a relationship between pressure loss and a proportion of the number of open cells in the number of a plurality of cells of a honeycomb filter in Examples and Comparative Examples.

In Table 1 and the graphs in FIGS. 11 and 12, the "proportion of the number of the open cells in the number of the plurality of cells of the honeycomb filter" is simply referred to as "proportion of open cell."

TABLE 1

|  | The number of open cell of the first honeycomb fired body (pcs) | The number of the first honeycomb fired body (pcs) | The number of the second honeycomb fired body (pcs) | The number of open cell of honeycomb filter (pcs) | Proportion of open cell (%) | Capture efficiency of PM (%) | Pressure loss (kPa) |
|---|---|---|---|---|---|---|---|
| Example 1 | 1 | 5 | 11 | 5 | 0.1 | 99 | 4.8 |
| Example 2 | 1 | 10 | 6 | 10 | 0.2 | 98 | 4.4 |
| Example 3 | 5 | 10 | 6 | 50 | 1.1 | 91 | 3.8 |
| Example 4 | 10 | 10 | 6 | 100 | 2.2 | 79 | 3.6 |
| Example 5 | 15 | 10 | 6 | 150 | 3.3 | 71 | 3.2 |
| Example 6 | 20 | 10 | 6 | 200 | 4.4 | 63 | 3.1 |
| Example 7 | 22 | 10 | 6 | 220 | 4.9 | 60 | 3.0 |
| Comparative Example 1 | 23 | 10 | 6 | 230 | 5.1 | 59 | 2.9 |
| Comparative Example 2 | — | 0 | 16 | 0 | 0 | 99.9 | 5.5 |

First, as a result of the measurement of the capture efficiency of PM, the capture efficiency of PM was 99.9% when the proportion of the number of the open cell was 0% relative to the number of the plurality of cells of the honeycomb filter as in Comparative Example 2, specifically when the honeycomb filter included no open cells.

On the other hand, the capture efficiency of PM was from 60% to 99% when the proportion of the number of the open cells was from 0.1% to 4.9% relative to the number of the plurality of cells of the honeycomb filter as in Examples 1 to 7. It is considered that the honeycomb filter with the open cells reduces the capture efficiency of PM compared with the honeycomb filter with no open cell.

On the other hand, when the proportion of the number of the open cells was 5.1% relative to the number of the plurality of cells of the honeycomb filter as in Comparative Example 1, the capture efficiency of PM was 59%.

FIG. 11 suggests that the capture efficiency of PM decreases approximately linearly as the proportion of the number of the open cells in the number of the plurality of cells of the honeycomb filter increases.

Next, the result of the pressure loss measurement is shown. As in Comparative Example 2, when the proportion of the number of the open cell was 0% relative to the number of the plurality of cells of the honeycomb filter, specifically, when the honeycomb filter included no open cells, the pressure loss was a high value of 5.5 kPa.

On the other hand, as in Examples 1 to 7, when the proportion of the number of the open cells was from 0.1% to 4.9% relative to the number of the plurality of cells of the honeycomb filter, the pressure loss was from 3.0 kPa to 4.8 kPa. This result suggests that the honeycomb filter with the open cells can reduce the pressure loss compared with the honeycomb filter with no open cell.

On the other hand, when the proportion of the number of the open cells was 5.1% relative to the number of the plurality of cells of the honeycomb filter as in Comparative Example 1, the pressure loss was 2.9 kPa.

Moreover, FIG. 12 suggests that when the proportion of the number of the open cells is from 0.2% to 1.1% relative to the number of the plurality of cells of the honeycomb filter, the pressure loss significantly decreases as the proportion of the number of the open cells in the number of the plurality of cells of the honeycomb filter increases.

Thus, these results suggest that the pressure loss can be more easily decreased significantly without any appreciable reduction in capture efficiency of PM by providing the honeycomb filter with the open cells and setting the proportion of the number of the open cells in the number of the plurality of cells to from about 0.1% to about 4.9%.

Particularly, when the proportion of the number of the open cells in the number of the plurality of cells of the honeycomb filter was from about 0.2% to about 1.1%, the capture efficiency of PM can keep high values of from 91% to 98%, and on the other hand, the low pressure loss pressure loss of from 3.8 kPa to 4.4 kPa can be achieved.

When the capture efficiency of PM is about 60% or more and the pressure loss is about 5 kPa or less, such a honeycomb filter can be practically used as one for purifying exhaust gases containing PMs in a small amount, a typical example of which is an exhaust gas emitted from gasoline engines. Therefore, the honeycomb filter including the open cells at a specific proportion can be used as a gasoline particulate filter.

(Second Embodiment)

The following will mention a second embodiment, which is one embodiment of the present invention.

In the present embodiment, a honeycomb filter is formed of a single honeycomb fired body. Such a honeycomb filter, which is formed of a single honeycomb fired body, is also referred to as an integral honeycomb filter.

Figure 13A:
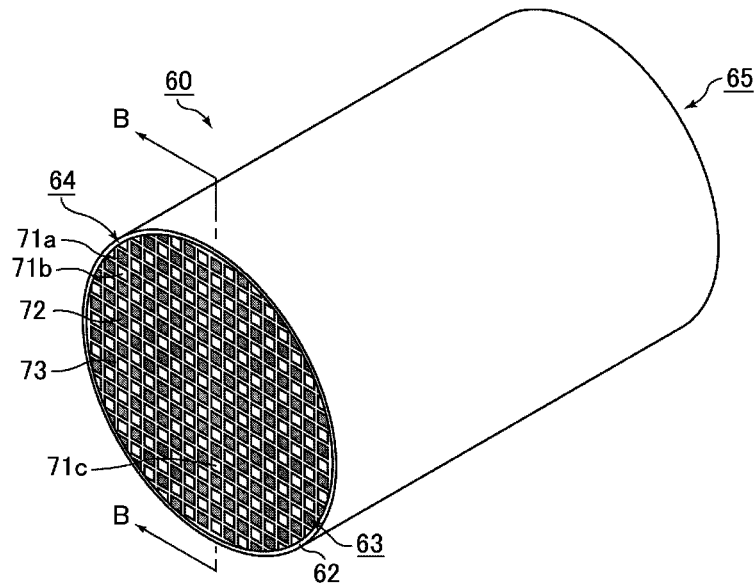
FIG. 13A is a perspective view schematically illustrating one example of a honeycomb filter according to a second embodiment of the present invention as viewed from one end face side.
Figure 13B:
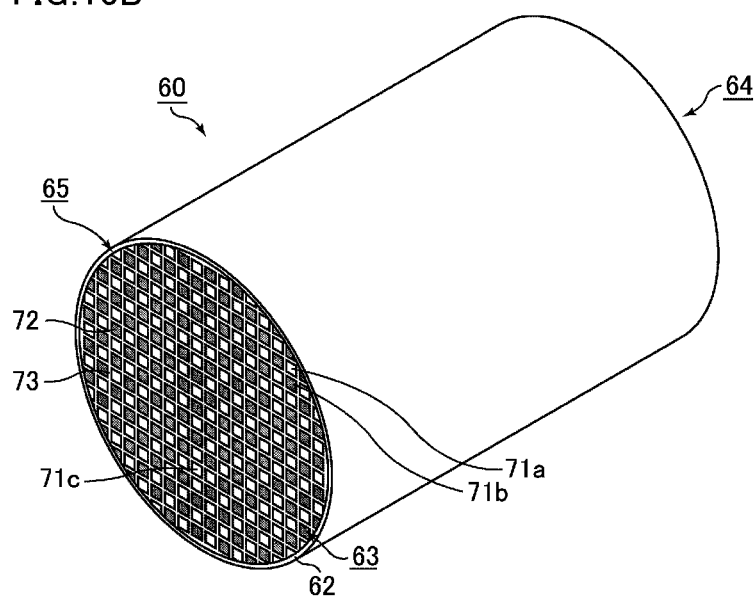
FIG. 13B is a perspective view schematically illustrating the honeycomb filter illustrated in FIG. 13A as viewed from the other end face side.
Figure 14A:
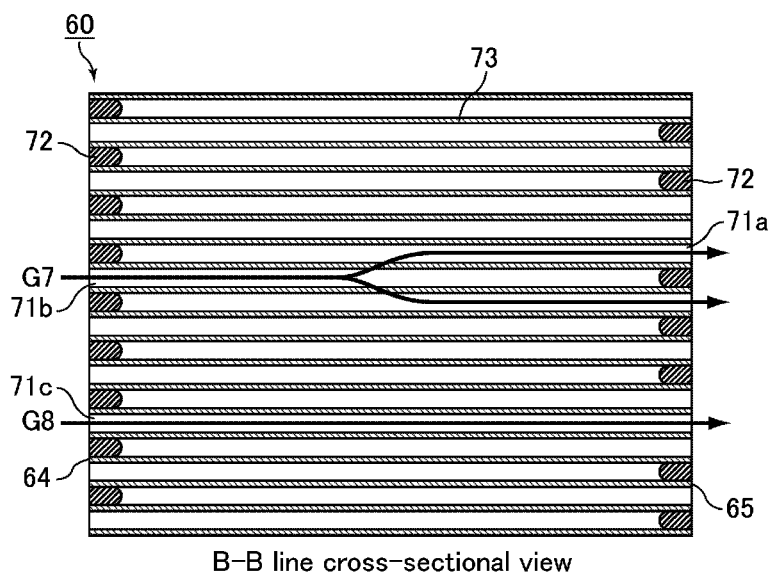
FIGS. 14A and 14B are cross-sectional views taken along line B-B of the honeycomb filter illustrated in FIG. 13A.
Figure 14B:
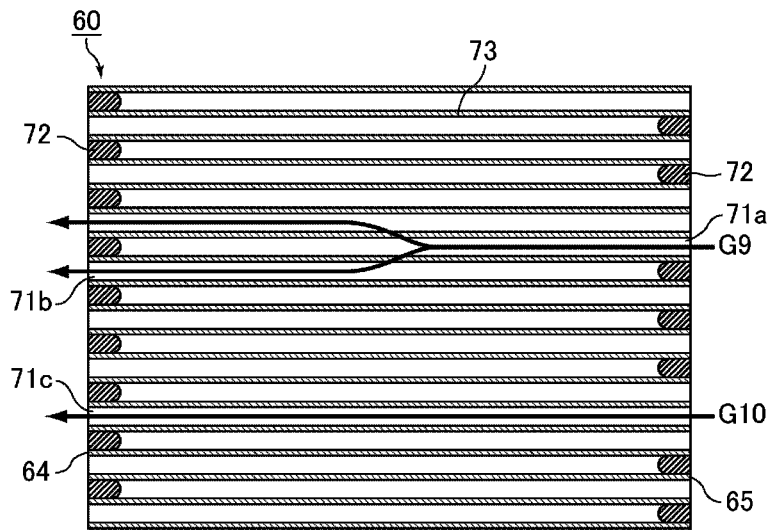

FIG. 13A is a perspective view schematically illustrating one example of a honeycomb filter according to the second embodiment of the present invention as viewed from one end face side. FIG. 13B is a perspective view schematically illustrating the honeycomb filter illustrated in FIG. 13A as viewed from the other end face side. FIGS. 14A and 14B are cross-sectional views taken along line B-B of the honeycomb filter illustrated in FIG. 13A.

A honeycomb filter 60 shown in FIG. 13A has one end face 64 and the other end face 65. The honeycomb filter 60 includes: a ceramic block 63 formed of a single pillar-shaped honeycomb fired body having a plurality of cells 71a, 71b, and 71c longitudinally disposed in parallel with one another with a cell wall 73 interposed therebetween; and a coat layer 62 formed around the ceramic block 63. The coat layer may be formed if necessary.

Cordierite or aluminum titanate maybe used as the main component material of the honeycomb fired body constituting the integral honeycomb filter.

As illustrated in FIGS. 13A and 13B, the honeycomb filter 60 includes a first sealed cell 71a, a second sealed cell 71b, and an open cell 71c. The first sealed cell 71a has an end sealed with a plug 72 on the side of the one end face 64 and has an open end on the side of the other end face 65. The second sealed cell 71b has an open end on the side of the one end face 64 and has an end sealed with the plug 72 on the side of the other end face 65. The open cell 71 has open ends on the both sides of the one end face 64 and the other end face 65.

On the side of the one end face 64 of the honeycomb filter 60, the cell 71a having a sealed end and the cell 71b or 71c having an open end are alternately disposed.

On the side of the other end face 65 of the honeycomb filter 60, more cells having an open end exist than on the side of the one end face 64 of the honeycomb filter 60 by the number of the open cell 21c.

Thus, in the honeycomb filter 60, a majority of the plurality of cells are the sealed cells sealed at either one end, and a part of the plurality of the cells is the open cell open at both ends.

The honeycomb filter of the present embodiment is characterized in that the number of the open cell is from about 0.1% to about 4.9% of the number of the plurality of cells, as in the honeycomb filter according to the first embodiment of the present invention. The number of the open cell is desirably from about 0.2% to about 1.1% of the number of the plurality of cells.

When the honeycomb filter includes the open cell, the pressure loss can be more easily decreased compared with the honeycomb filter including no open cells.

If the number of the open cell is about 0.1% or more of number of the plurality of cells, the effect of reducing the pressure loss tends to be easily obtained. If the number of the open cell is about 4.9% or less of the number of the plurality of cells, the pressure loss can be more easily decreased, and the capture efficiency of PM tends not to be reduced too much. As a result, the functions as the filter tends not to be deteriorated.

Particularly, when the number of the open cell is from about 0.2% to about 1.1% of the number of the plurality of cells, the pressure loss can be more easily decreased significantly without reducing the capture efficiency of PM.

The following will mention flow of exhaust gases that flow into the honeycomb filter according to the embodiments of the present invention.

As illustrated in FIG. 14A, an exhaust gas G7 that flows into the second sealed cell 71b from the side of the one end face 64 of the honeycomb filter 60 passes through the cell wall 73 that separates the first sealed cell 71a and the second sealed cell 71b to flow out from the first sealed cell 71a. Thus, the cell wall 73 functions as a filter for capturing PMs and the like.

On the other hand, an exhaust gas G8 that flows into the open cell 71c from the side of the one end face 64 of the honeycomb filter 60 directly passes through the open cell 71c.

Further, as illustrated in FIG. 14B, an exhaust gas G9 that flows into the first sealed cell 71a from the side of the other end face 65 of the honeycomb filter 60 passes through the cell wall 73 that separates the first sealed cell 71a and the second sealed cell 71b to flow out from the second sealed cell 71b. Thus, the cell wall 73 functions as a filter for capturing PMs and the like.

On the other hand, an exhaust gas G10 that flows into the open cell 71c from the side of the other end face 65 of the honeycomb filter 60 directly passes through the open cell 71c.

Thus, among the exhaust gases that are introduced from the end face 64 or 65 of the honeycomb filter 60, the exhaust gases G7 and G9, which constitute a majority of the exhaust gases, pass through the cell wall 73, and the exhaust gases G8 and G10, which constitute some of the exhaust gases, directly pass through the open cell.

An exhaust gas purifying apparatus of the present embodiment is an exhaust gas purifying apparatus in which such a honeycomb filter is disposed such that the end face where the cells having a sealed end and the cells having an open end are alternately disposed is disposed on the gas inlet side of the metal casing, and the other end face is disposed on the gas outlet side of the metal casing. The exhaust gas purifying apparatus of the present embodiment purifies exhaust gases in the same manner as in the exhaust gas purifying apparatus according to the first embodiment of the present invention.

When the honeycomb filter of the present embodiment is manufactured, a honeycomb molded body is prepared in the same manner as in the first embodiment of the present invention, except that the honeycomb molded body, which is formed by extrusion-molding, is larger than the above-mentioned honeycomb molded body of the first embodiment, and has an outer shape different from that of the above-mentioned honeycomb molded body according to the first embodiment of the present invention.

Other processes are almost the same as in the manufacturing processes of the honeycomb filter according to the first embodiment of the present invention.

However, in the present embodiment, the honeycomb filter is formed of a single honeycomb fired body, which obviates the need of the combining and the periphery-cutting.

Using the manufactured honeycomb filter, the exhaust gas purifying apparatus can be manufactured in the same manner as in the first embodiment of the present invention.

The honeycomb filter and the exhaust gas purifying apparatus of the present embodiment can also exhibit the effects (1) to (6) mentioned in the first embodiment of the present invention.

(Other Embodiments)

In the honeycomb filters according to the first and second embodiments of the present invention, on the side of the one end face of the honeycomb filter, the cells having a sealed end and the cells having an open end are alternately disposed. However, in the honeycomb filter according to the embodiments of the present invention, it is sufficient that the proportion of the number of the open cell(s) in the number of the plurality of cells is within a specific range, and the position of the open cell(s) is not especially limited. Therefore, on the both end face sides of the honeycomb filter, the cells having a sealed end and the cells having an open end may not be necessarily alternately disposed.

The exhaust gas purifying apparatuses according to the first and second embodiments of the present invention include the honeycomb filter in which the cells having a sealed end and the cells having an open end are alternately disposed on the side of the one end face. The honeycomb filter is disposed such that the one end face is disposed on the gas inlet side of the metal casing and the other end face is disposed on the gas outlet side of the metal casing. In the exhaust gas purifying apparatus according to the embodiments of the present invention, it is sufficient that the honeycomb filter includes the open cell as a part of the cells, and the arrangement direction of the honeycomb filter is not especially limited.

When the honeycomb filter according to the embodiments of the present invention is an aggregated honeycomb filter, with respect to the honeycomb fired bodies that configure the aggregated honeycomb filter, the number of the honeycomb fired body with the open cell(s) is not especially limited provided that the entire honeycomb filter includes the open cell(s) at a specific proportion.

For example, all the honeycomb fired bodies that configure the aggregated honeycomb filter may be provided with the open cell(s), or only one honeycomb fired body that configures the aggregated honeycomb filter may be provided with the open cell(s).

The shape of the honeycomb filter according to the embodiments of the present invention is not particularly limited to the substantially round pillar shape, and the honeycomb filter may have any desired pillar shape such as a substantially cylindroid shape and a substantially polygonal pillar shape.

In the honeycomb filter according to the embodiments of the present invention, the porosity of the honeycomb fired body that configures the aggregated honeycomb filter and the honeycomb fired body that configures the integral honeycomb filter is not particularly limited, and is desirably from about 35% to about 60%.

The porosity of the honeycomb fired body of about 35% or more may hardly cause clogging in the honeycomb filter, while the porosity of the honeycomb fired body of about 60% or less tends not to cause a decrease in strength of the honeycomb filter with the result that the honeycomb filter might be hardly broken.

The average pore diameter of the honeycomb fired body that configures the aggregated honeycomb filter and the honeycomb fired body that configures the integral honeycomb filter is desirably from about 5 µm to about 30 µm.

The average pore diameter of the honeycomb fired body of about 5 µm or more may hardly cause clogging of particulates. On the other hand, the filter with an average pore diameter of the honeycomb fired body of about 30 µm or less does not allow particulates to easily pass through the pores, and more easily captures the particulates, and as a result, it can easily function as a filter.

Here, the above-mentioned porosity and pore diameter can be measured through known methods, such as a measuring method using a mercury porosimeter, Archimedes method and a measuring method using a scanning electron microscope (SEM).

The cell wall thickness of the honeycomb fired body is not particularly limited, and desirably from about 0.2 mm to about 0.4 mm.

If the thickness of the cell wall is about 0.2 mm or more, the cell wall is not so thin that it may be able to easily hold the strength of the honeycomb fired body; whereas the thickness of the cell wall of about 0.4 or less mm may hardly cause an increase in pressure loss of the honeycomb filter.

The cell density on a cross section perpendicular to the longitudinal direction of the honeycomb fired body is not particularly limited. A desirable lower limit is about 31.0 pcs/cm$^2$ (about 200 pcs/inch$^2$) and a desirable upper limit is about 93.0 pcs/cm$^2$ (about 600 pcs/inch$^2$). A more desirable lower limit is about 38.8 pcs/cm$^2$ (about 250 pcs/inch$^2$) and a more desirable upper limit is about 77.5 pcs/cm$^2$ (about 500 pcs/inch$^2$).

As mentioned above, the number of the plurality of cells is the sum of the number of the sealed cells and the number of the open cell(s), and the number of the cells having a cross-sectional shape different from that of the other cells is not counted as the plurality of cells.

In the honeycomb filter according to the embodiments of the present invention, the shape of the cross section perpendicular to the longitudinal direction of the honeycomb fired body of the respective cells is not especially limited to a substantially quadrangular shape, and may be any shape such as a substantially circular shape, a substantially elliptical shape, a substantially pentagonal shape, a substantially hexagonal shape, a substantially trapezoidal shape, or a substantially octagonal shape. Various shapes may be allowed to coexist.

In the combining upon manufacturing the aggregated honeycomb filter, instead of the method in which an adhesive paste is applied to side faces of each honeycomb fired body, for example, another method may be used in which, with respective honeycomb fired bodies temporarily secured in a frame having substantially the same shape as the shape of a ceramic block (or an aggregated body of honeycomb fired bodies) to be manufactured, an adhesive paste is injected between the respective honeycomb fired bodies.

Upon manufacturing the aggregated honeycomb filter, a plurality of kinds of honeycomb fired bodies having respectively different cross-sectional shapes were manufactured, and by combining the plurality of kinds of honeycomb fired bodies, a ceramic block constituted by the plurality kinds of honeycomb fired bodies combined with one another with an adhesive layer interposed therebetween was manufactured without cutting the outer periphery thereof.

For example, the following three kinds of honeycomb fired bodies having respectively different cross-sectional shapes may be manufactured. A first honeycomb fired body has a cross-sectional shape surrounded by two substantially straight lines and one substantially curved line. A second honeycomb fired body has a cross-sectional shape surrounded by three substantially straight lines and one substantially curved line. A third honeycomb fired body has a cross-sectional shape surrounded by four substantially straight lines (substantially quadrangular shape). These three kinds of honeycomb fired bodies having respectively different cross-sectional shapes can be manufactured by changing the shape of a die to be used for the extrusion. By using 8 pieces of the first honeycomb fired bodies, 4 pieces of the second honeycomb fired bodies, and 4 pieces of the third honeycomb fired bodies in combination, a honeycomb filter with a substantially round pillar shape can be manufactured.

The main component of the honeycomb fired body that configures the aggregated honeycomb filter and the honeycomb fired body that configures the integral honeycomb filter is not limited to silicon carbide, and may be powders of the following ceramics: nitride ceramics such as aluminum nitride, silicon nitride, boron nitride, and titanium nitride; carbide ceramics such as zirconium carbide, titanium carbide, tantalum carbide, and tungsten carbide; oxide ceramics such as alumina, zirconia, cordierite, mulite, aluminum titanate; and the like.

Among these components, non-oxide ceramics are preferable, and silicon carbide is particularly preferable, as the main component of the honeycomb fired body that configures the aggregated honeycomb filter. This is because they are excellent in thermal resistance, mechanical strength, thermal conductivity and the like. Moreover, ceramic materials such as silicon-containing ceramics, in which the above-mentioned ceramic is blended with metallic silicon, and ceramics in which the above-mentioned ceramic is bonded by silicon or silicate compounds can also be used as the constitutional material. Among these, silicon carbide blended with metallic silicon (silicon-containing silicon carbide) is preferable.

In particular, ceramics of silicon-containing silicon carbide including about 60% by weight or more of silicon carbide are preferable.

The main component of the honeycomb fired body that configures the integral honeycomb filter is desirably cordierite or aluminum titanate.

The organic binder in the wet mixture, which is used for manufacturing the honeycomb fired body that configures the aggregated honeycomb filter and the honeycomb fired body that configures the integral honeycomb filter is not particularly limited, and examples thereof include methyl cellulose, carboxymethyl cellulose, hydroxyethyl cellulose, polyethylene glycol, and the like. Among these, methyl cellulose is more desirably used. In general, the blending amount of the organic binder is desirably from about 1 part by weight to about 10 parts by weight with respect to 100 parts by weight of the ceramic powder.

The plasticizer contained in the wet mixture is not particularly limited, and for example, glycerin or the like may be used as the plasticizer.

Moreover, the lubricant contained in the wet mixture is not especially limited, and for example, polyoxyalkylene-based compounds, such as polyoxyethylene alkyl ether and polyoxypropylene alkyl ether, or the like may be used.

Specific examples of the lubricant include, for example, polyoxyethylene monobutyl ether, polyoxypropylene monobutyl ether, and the like.

Here, the plasticizer and the lubricant are not necessarily contained in the wet mixture depending on cases.

Upon preparing the wet mixture, a dispersant solution maybe used, and examples thereof include water, an organic solvent such as benzene, an alcohol such as methanol and the like.

Moreover, a molding auxiliary may be added to the wet mixture.

The molding auxiliary is not particularly limited, and examples thereof include ethylene glycol, dextrin, fatty acid, fatty acid soap, polyalcohol, and the like.

Furthermore, a pore-forming agent, such as balloons that are fine hollow spheres including an oxide-based ceramic, spherical acrylic particles, and graphite maybe added to the wet mixture, if necessary.

With respect to the balloons, not particularly limited, for example, alumina balloons, glass micro-balloons, shirasu balloons, fly ash balloons (FA balloons), mullite balloons and the like may be used. Among these, alumina balloons are more desirably used.

In the first embodiment of the present invention, the same material as that of the wet mixture is used as the plug material paste for sealing the cells. However, the plug material paste is not especially limited, and a plug material paste that allows plugs formed through post processes to have a porosity of from about 30% to about 75% is desirably used.

Examples of the inorganic binder contained in the adhesive paste and the coating material paste include silica sol, alumina sol and the like. Each of these may be used alone or two or more kinds of these may be used in combination. Silica sol is more desirably used among the inorganic binders.

Examples of the organic binder contained in the adhesive paste and the coating material paste include polyvinyl alcohol, methyl cellulose, ethyl cellulose, carboxymethyl cellulose and the like. Each of these may be used alone or two or more kinds of these may be used in combination. Carboxymethyl cellulose is more desirably used among the organic binders.

Examples of the inorganic fibers contained in the adhesive paste and the coating material paste include fibers of ceramics such as silica-alumina, mullite, alumina, and silica. Each of these may be used alone or two or more kinds of these may be used in combination. Alumina fibers are more desirably used among the inorganic fibers.

Examples of the inorganic particles contained in the adhesive paste and the coating material paste include particles of carbides, nitrides, and the like, and specific examples thereof include silicon carbide particles, silicon nitride particles, boron nitride particles and the like. Each of these may be used alone, or two or more kinds of these may be used in combination. Among the inorganic particles, silicon carbide particles are desirably used due to its superior thermal conductivity.

Furthermore, a pore-forming agent, such as balloons that are fine hollow spheres including an oxide-based ceramic, spherical acrylic particles and graphite may be added to the adhesive paste and the coating material paste, if necessary. The balloons are not particularly limited, and for example, alumina balloons, glass micro-balloons, shirasu balloons, fly ash balloons (FA balloons), mullite balloons, and the like maybe used. Among these, alumina balloons are more desirably used.

A catalyst may be supported on the cell wall of the honeycomb filter according to the embodiments of the present invention.

When a catalyst capable of converting harmful gaseous components such as CO, HC, and NOx in an exhaust gas is supported on the cell wall of the honeycomb filter, the harmful gaseous components in the exhaust gas can be easily converted sufficiently by catalytic reaction. Moreover, when a catalyst for assisting combustion of PMs is supported on the cell wall of the honeycomb filter, the PMs are more easily burned and removed.

The catalyst may be supported on the cell wall of the honeycomb filter or on the cell wall of the honeycomb fired body.

In the case where a catalyst is supported, desirably, an alumina film having a large specific surface area is formed on the surface of the cell wall of the honeycomb filter or the honeycomb fired body, and a co-catalyst as well as a catalyst such as platinum is applied to the surface of this alumina film.

With respect to the method for forming the alumina film on the surface of the cell wall of the honeycomb filter, for example, a method in which the honeycomb filter is impregnated with a solution of a metal compound containing aluminum such as $Al(NO_3)_3$ and then heated and a method in which the honeycomb filter is impregnated with a solution containing alumina powder and then heated, are proposed.

With respect to the method for applying a co-catalyst to the alumina film, for example, a method in which the honeycomb filter is impregnated with a solution of a metal compound containing a rare-earth element, such as $Ce(NO_3)_3$, and then heated is proposed.

With respect to the method for applying a catalyst to the alumina film, for example, a method in which the cell wall of the honeycomb filter is impregnated with a solution of diamine dinitro platinum nitric acid ($[Pt(NH_3)_2(NO_2)_2]$ $HNO_3$, platinum concentration: about 4.53% by weight) and then heated is proposed.

Moreover, a catalyst may be applied through a method in which after the catalyst has been preliminarily applied to alumina particles, the cell wall of the honeycomb filter is impregnated with a solution containing the alumina powder bearing the catalyst applied thereto, and then heated.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A honeycomb filter comprising:
   cell walls extending along a longitudinal direction of the honeycomb filter to define a plurality of cells each of which has one end and another end opposite to the one end along the longitudinal direction,
   wherein a majority of said plurality of cells are sealed cells sealed at either the one end or the another end,
   a part of said plurality of cells are open cells open at both of the one end and the another end, and
   a number of said open cells is from about 0.2% to about 1.1% of a number of said plurality of cells.

2. The honeycomb filter according to claim 1,
   wherein
   on one end face side of said honeycomb filter, cells having a sealed end and cells having an open end among said plurality of cells are alternately disposed,
   the cells having a sealed end on said one end face side have an open end on the another end face side, and are said sealed cells,
   a majority of the cells having an open end on said one end face side have a sealed end on the another end face side, and are said sealed cells, and
   a part of the cells having an open end on said one end face side has an open end on the another end face side, and are said open cells.

3. The honeycomb filter according to claim 1, comprising a plurality of honeycomb fired bodies combined with one another with an adhesive layer interposed between the honeycomb fired bodies.

4. The honeycomb filter according to claim 3,
   wherein
   one honeycomb fired body among the honeycomb fired bodies comprises a predetermined number of the open cells, and other honeycomb fired bodies among the honeycomb fired bodies do not comprise the open cells, the one honeycomb fired body and the other honeycomb fired bodies being combined with each other.

5. The honeycomb filter according to claim 3,
   wherein the honeycomb fired bodies each have said open cells as a part of the plurality of cells.

6. The honeycomb filter according to claim 3, comprising an outer periphery subjected to cutting.

7. The honeycomb filter according to claim 3, comprising:
   the honeycomb fired body having a cross-sectional shape surrounded by four substantially straight lines;
   the honeycomb fired body having a cross-sectional shape surrounded by two substantially straight lines and one curved line; and
   the honeycomb fired body having a cross-sectional shape surrounded by three substantially straight lines and one curved line.

8. The honeycomb filter according to claim 3,
   wherein
   the main component of the honeycomb fired body is silicon carbide or silicon-containing silicon carbide.

9. The honeycomb filter according to claim 1, comprising a single honeycomb fired body.

10. The honeycomb filter according to claim 9,
    wherein
    the main component of the honeycomb fired body is cordierite or aluminum titanate.

11. The honeycomb filter according to claim 1,
    wherein
    a coat layer is formed on the outer peripheral face of the honeycomb filter.

12. The honeycomb filter according to claim 1, comprising a plurality of the honeycomb fired bodies or one honeycomb fired body,
    wherein
    a porosity of each of the honeycomb fired bodies is from about 35% to about 60%.

13. The honeycomb filter according to claim 1, comprising a plurality of the honeycomb fired bodies or one honeycomb fired body,
    wherein
    an average pore diameter of each of the honeycomb fired bodies is from about 5 μm to about 30 μm.

14. The honeycomb filter according to claim 1, comprising a plurality of the honeycomb fired bodies or one honeycomb fired body,
    wherein
    a thickness of the cell walls of each of the honeycomb fired bodies is from about 0.2 mm to about 0.4 mm.

15. The honeycomb filter according to claim 1, comprising a plurality of the honeycomb fired bodies or one honeycomb fired body,
    wherein
    a cell density on a cross section perpendicular to the longitudinal direction of each of the honeycomb fired bodies is from about 31.0 pcs/cm$^2$ to about 93.0 pcs/cm$^2$.

16. The honeycomb filter according to claim 1,
    wherein
    a catalyst is supported on the cell walls of the honeycomb filter.

17. A honeycomb filter comprising:
    cell walls extending along a longitudinal direction of the honeycomb filter to define a plurality of cells each of which has one end and another end opposite to the one end along the longitudinal direction;
    a plurality of honeycomb fired bodies combined with one another with an adhesive layer interposed between the honeycomb fired bodies; and
    a honeycomb fired body having no open cell,
    wherein a majority of said plurality of cells are sealed cells sealed at either the one end or the another end,
    a part of said plurality of cells are open cells open at both of the one end and the another end, and
    a number of said open cells is from about 0.1% to about 4.9% of a number of said plurality of cells.

18. The honeycomb filter according to claim 17,
    wherein
    the number of the open cells of the honeycomb fired body is almost the same among all the honeycomb fired bodies.

19. The honeycomb filter according to claim 17,
    wherein the number of the open cells of the honeycomb fired body differs from one honeycomb fired body to another honeycomb fired body.

20. An exhaust gas purifying apparatus, comprising:
a metal casing provided with a gas inlet side and a gas outlet side; and
a honeycomb filter installed in said metal casing,
wherein
the honeycomb filter comprises cell walls extending along a longitudinal direction of the honeycomb filter to define a plurality of cells each of which has one end and another end opposite to the one end along the longitudinal direction,
a majority of said plurality of cells are sealed cells sealed at either the one end or the another end,
a part of said plurality of cells are an open cells open at both of the one end and the another end, and
a number of said open cells is from about 0.2% to about 1.1% of a number of said plurality of cells.

21. The exhaust gas purifying apparatus according to claim 20,
wherein
on one end face side of said honeycomb filter, cells having a sealed end and cells having an open end among said plurality of cells are alternately disposed,
the cells having a sealed end on said one end face side have an open end on the another end face side, and are said sealed cells,
a majority of the cells having an open end on said one end face side have a sealed end on the another end face side, and are said sealed cells,
a part of the cells having an open end on said one end face side has an open end on the another end face side, and are said open cells,
the one end face of said honeycomb filter is disposed on the gas inlet side of said metal casing, and
the another end face of said honeycomb filter is disposed on the gas outlet side of said metal casing.

22. The exhaust gas purifying apparatus according to claim 20,
wherein
the honeycomb filter comprises a plurality of honeycomb fired bodies combined with one another with an adhesive layer interposed between the honeycomb fired bodies.

23. The exhaust gas purifying apparatus according to claim 20,
wherein
the honeycomb filter comprises a single honeycomb fired body.

24. The exhaust gas purifying apparatus according to claim 22,
wherein
the honeycomb filter is formed by combining one honeycomb fired body among the honeycomb fired bodies with a predetermined number of the open cells and other honeycomb fired bodies among the honeycomb fired bodies with no open cell.

25. The exhaust gas purifying apparatus according to claim 22,
wherein
the honeycomb filter is formed by only honeycomb fired bodies each having said open cells as a part of the plurality of cells.

26. The exhaust gas purifying apparatus according to claim 22,
wherein
the outer periphery of the honeycomb filter has been subjected to cutting.

27. The exhaust gas purifying apparatus according to claim 22,
wherein
the honeycomb filter is formed by three kinds of honeycomb fired bodies, the honeycomb filter comprising:
the honeycomb fired body having a cross-sectional shape surrounded by four substantially straight lines;
the honeycomb fired body having a cross-sectional shape surrounded by two substantially straight lines and one curved line; and
the honeycomb fired body having a cross-sectional shape surrounded by three substantially straight lines and one curved line.

28. The exhaust gas purifying apparatus according to claim 22,
wherein
the main component of the honeycomb fired body is silicon carbide or silicon-containing silicon carbide.

29. The exhaust gas purifying apparatus according to claim 23,
wherein
the main component of the honeycomb fired body is cordierite or aluminum titanate.

30. The exhaust gas purifying apparatus according to claim 20,
wherein
a coat layer is formed on the outer peripheral face of the honeycomb filter.

31. The exhaust gas purifying apparatus according to claim 20,
wherein
the honeycomb filter comprises a plurality of the honeycomb fired bodies or one honeycomb fired body, and
a porosity of each of the honeycomb fired bodies is from about 35% to about 60%.

32. The exhaust gas purifying apparatus according to claim 20,
wherein
the honeycomb filter comprises a plurality of the honeycomb fired bodies or one honeycomb fired body, and
an average pore diameter of each of the honeycomb fired bodies is from about 5 µm to about 30 µm.

33. The exhaust gas purifying apparatus according to claim 20,
wherein
the honeycomb filter comprises a plurality of the honeycomb fired bodies or one honeycomb fired body, and
a thickness of the cell walls of each of the honeycomb fired bodies is from about 0.2 mm to about 0.4 mm.

34. The exhaust gas purifying apparatus according to claim 20,
wherein
the honeycomb filter comprises a plurality of the honeycomb fired bodies or one honeycomb fired body, and
a cell density on a cross section perpendicular to the longitudinal direction of each of the honeycomb fired bodies is from about 31.0 pcs/cm$^2$ to about 93.0 pcs/cm$^2$.

35. The exhaust gas purifying apparatus according to claim 20,
wherein
a catalyst is supported on the cell walls of the honeycomb filter.

36. The exhaust gas purifying apparatus according to claim 20, wherein said gas is an exhaust gas emitted from a gasoline engine.

37. The exhaust gas purifying apparatus according to claim 20,
wherein
the honeycomb filter is housed singly in the metal casing.

38. The exhaust gas purifying apparatus according to claim 20,
wherein
the honeycomb filter is housed in the metal casing together with a honeycomb structure used as another catalyst carrier.

39. The exhaust gas purifying apparatus according to claim 20,
wherein
a mat mainly comprising inorganic fibers as a holding sealing material is wound around the honeycomb filter.

40. An exhaust gas purifying apparatus, comprising:
a metal casing provided with a gas inlet side and a gas outlet side; and
a honeycomb filter installed in said metal casing,
wherein
the honeycomb filter comprises cell walls extending along a longitudinal direction of the honeycomb filter to define a plurality of cells each of which has one end and another end opposite to the one end along the longitudinal direction,
the honeycomb filter comprises a plurality of honeycomb fired bodies combined with one another with an adhesive layer interposed between the honeycomb fired bodies,
the honeycomb filter comprises a honeycomb fired body having no open cell,
a majority of said plurality of cells are sealed cells sealed at either the one end or the another end,
a part of said plurality of cells are an open cells open at both of the one end and the another end, and
a number of said open cells is from about 0.1% to about 4.9% of a number of said plurality of cells.

41. The exhaust gas purifying apparatus according to claim 40,
wherein
the number of the open cells of the honeycomb fired body is almost the same among all the honeycomb fired bodies.

42. The exhaust gas purifying apparatus according to claim 40,
wherein
the number of the open cells of the honeycomb fired body differs from one honeycomb fired body to another honeycomb fired body.

* * * * *